United States Patent
Doshi et al.

(10) Patent No.: US 12,405,767 B2
(45) Date of Patent: Sep. 2, 2025

(54) MERGING AND VISUALIZING OBSERVABILITY DATA SETS

(71) Applicant: Rubrik, Inc., Palo Alto, CA (US)

(72) Inventors: Shubham Doshi, Bengaluru (IN); Nikita Dwivedi, Bengaluru (IN); Akash Gupta, Bengaluru (IN); Gaurav Maheshwari, Bengaluru (IN)

(73) Assignee: Rubrik, Inc., Palo Alto, CA (US)

( * ) Notice: Subject to any disclaimer, the term of this patent is extended or adjusted under 35 U.S.C. 154(b) by 181 days.

(21) Appl. No.: 18/467,332

(22) Filed: Sep. 14, 2023

(65) Prior Publication Data

US 2025/0094124 A1 Mar. 20, 2025

(51) Int. Cl.
*G06F 7/14* (2006.01)
*G06F 11/07* (2006.01)
*H04L 9/32* (2006.01)

(52) U.S. Cl.
CPC ............ *G06F 7/14* (2013.01); *G06F 11/0709* (2013.01); *G06F 11/079* (2013.01); *H04L 9/3213* (2013.01)

(58) Field of Classification Search
None
See application file for complete search history.

(56) References Cited

U.S. PATENT DOCUMENTS

| | | | | |
|---|---|---|---|---|
| 6,751,789 B1 * | 6/2004 | Berry | ................... | G06F 11/3466 717/130 |
| 7,529,782 B2 * | 5/2009 | Prahlad | ................. | G06F 16/178 |
| 8,108,343 B2 * | 1/2012 | Wang | ...................... | G06F 16/27 707/625 |
| 8,966,452 B2 * | 2/2015 | Gataullin | ............ | G06F 11/3636 717/128 |
| 9,311,220 B1 * | 4/2016 | Ha | ......................... | G06F 11/079 |
| 10,866,939 B2 * | 12/2020 | Danichev | ............ | G06F 11/0751 |
| 11,030,068 B1 * | 6/2021 | Agarwal | ............... | G06F 11/327 |
| 11,240,126 B2 * | 2/2022 | Makwarth | ........... | H04L 41/5009 |
| 11,775,501 B2 * | 10/2023 | Ross | ................... | G06F 11/3476 707/690 |
| 12,086,016 B2 * | 9/2024 | Bertran | .................... | G06F 9/505 |
| 2014/0317603 A1 * | 10/2014 | Gataullin | ............ | G06F 11/3003 717/128 |
| 2014/0317604 A1 * | 10/2014 | Gataullin | ............ | G06F 11/3003 717/128 |
| 2018/0357261 A1 * | 12/2018 | Danichev | ................ | G06F 17/40 |
| 2025/0094124 A1 * | 3/2025 | Doshi | ....................... | G06F 7/14 |

* cited by examiner

*Primary Examiner* — Backhean Tiv
(74) *Attorney, Agent, or Firm* — Holland & Hart LLP

(57) ABSTRACT

A method for data processing is described. The method may include retrieving, from a cloud storage environment accessible to a data management system (DMS), two or more observability data sets associated with a set of time intervals within a selected time range. The observability data sets may contain a set of time-partitioned data blocks that include tracing data associated with operations performed by one or more nodes of a node cluster of the DMS during the selected time range. The method may further include merging the tracing data by selecting a first subset of overlapping time-partitioned data blocks, omitting a second subset of the overlapping time-partitioned data blocks, and retaining one or more non-overlapping time-partitioned data blocks. The method may further include transmitting data corresponding to a visualization of the merged tracing data.

20 Claims, 11 Drawing Sheets

MERGING AND VISUALIZING OBSERVABILITY DATA SETS

FIELD OF TECHNOLOGY

The present disclosure relates generally to data management, including techniques for merging and visualizing observability data sets.

BACKGROUND

A data management system (DMS) may be employed to manage data associated with one or more computing systems. The data may be generated, stored, or otherwise used by the one or more computing systems, examples of which may include servers, databases, virtual machines, cloud computing systems, file systems (e.g., network-attached storage (NAS) systems), or other data storage or processing systems. The DMS may provide data backup, data recovery, data classification, or other types of data management services for data of the one or more computing systems. Improved data management may offer improved performance with respect to reliability, speed, efficiency, scalability, security, or ease-of-use, among other possible aspects of performance.

SUMMARY

A method is described. The method includes: retrieving, from a cloud storage environment accessible to a data management system (DMS), two or more observability data sets associated with a set of time intervals within a selected time range, the two or more observability data sets including a set of time-partitioned data blocks that include tracing data associated with operations performed by one or more nodes of a node cluster of the DMS during the selected time range; merging, by a triage service of the DMS, the tracing data present in the two or more observability data sets based on selecting a first subset of overlapping time-partitioned data blocks that correspond to an overlapping time interval between the set of time intervals, omitting a second subset of the overlapping time-partitioned data blocks that correspond to the overlapping time interval, and retaining one or more non-overlapping time-partitioned data blocks that correspond to an earlier time interval or a later time interval of the set of time intervals; and transmitting, by the DMS, data corresponding to a visualization of the merged tracing data associated with the selected time range.

A DMS is described. The DMS includes: one or more memories storing code; and one or more processors coupled with the one or more memories. The one or more processors are individually or collectively operable to execute the code to cause the DMS to: retrieve, from a cloud storage environment accessible to a DMS, two or more observability data sets associated with a set of time intervals within a selected time range, the two or more observability data sets including a set of time-partitioned data blocks that include tracing data associated with operations performed by one or more nodes of a node cluster of the DMS during the selected time range; merge, by a triage service of the DMS, the tracing data present in the two or more observability data sets based on selecting a first subset of overlapping time-partitioned data blocks that correspond to an overlapping time interval between the set of time intervals, omitting a second subset of the overlapping time-partitioned data blocks that correspond to the overlapping time interval, and retaining one or more non-overlapping time-partitioned data blocks that correspond to an earlier time interval or a later time interval of the set of time intervals; and transmit, by the DMS, data corresponding to a visualization of the merged tracing data associated with the selected time range.

An apparatus is described. The apparatus includes: means for retrieving, from a cloud storage environment accessible to a DMS, two or more observability data sets associated with a set of time intervals within a selected time range, the two or more observability data sets including a set of time-partitioned data blocks that include tracing data associated with operations performed by one or more nodes of a node cluster of the DMS during the selected time range; means for merging, by a triage service of the DMS, the tracing data present in the two or more observability data sets based on selecting a first subset of overlapping time-partitioned data blocks that correspond to an overlapping time interval between the set of time intervals, omitting a second subset of the overlapping time-partitioned data blocks that correspond to the overlapping time interval, and retaining one or more non-overlapping time-partitioned data blocks that correspond to an earlier time interval or a later time interval of the set of time intervals; and means for transmitting, by the DMS, data corresponding to a visualization of the merged tracing data associated with the selected time range.

A non-transitory computer-readable medium is described. The non-transitory computer-readable medium stores code that includes instructions executable by one or more processors to: retrieve, from a cloud storage environment accessible to a DMS, two or more observability data sets associated with a set of time intervals within a selected time range, the two or more observability data sets including a set of time-partitioned data blocks that include tracing data associated with operations performed by one or more nodes of a node cluster of the DMS during the selected time range; merge, by a triage service of the DMS, the tracing data present in the two or more observability data sets based on selecting a first subset of overlapping time-partitioned data blocks that correspond to an overlapping time interval between the set of time intervals, omitting a second subset of the overlapping time-partitioned data blocks that correspond to the overlapping time interval, and retaining one or more non-overlapping time-partitioned data blocks that correspond to an earlier time interval or a later time interval of the set of time intervals; and transmit, by the DMS, data corresponding to a visualization of the merged tracing data associated with the selected time range.

Some examples described herein may further include operations, features, means, or instructions for detecting, by the DMS, a failure or performance issue associated with at least one operation performed by the one or more nodes of the node cluster, where the selected time range corresponds to the detected failure or performance issue.

Some examples described herein may further include operations, features, means, or instructions for generating, by the DMS, the visualization of the merged tracing data as part of a performance investigation related to the detected failure or performance issue.

Some examples described herein may further include operations, features, means, or instructions for: acquiring, by a distributed tracing service of the DMS, the tracing data from one or more processing services running on the one or more nodes of the node cluster; and uploading, to the cloud storage environment, the two or more observability data sets containing the tracing data.

Some examples described herein may further include operations, features, means, or instructions for: downloading, by the DMS, the two or more observability data sets from the cloud storage environment using a tracing support library; and writing, by the DMS, the tracing data from the two or more observability data sets to a data file using the tracing support library, where the triage service uses the data file to merge the tracing data associated with the selected time range.

Some examples described herein may further include operations, features, means, or instructions for: storing, by the DMS, the two or more observability data sets in a first type of cloud storage for a first duration of time; and archiving, by the DMS, the two or more observability data sets in a second type of cloud storage after the first duration of time.

In some examples described herein, the two or more observability data sets may be retained in the second type of cloud storage for a second duration of time indicated by a cloud retention policy of the DMS.

In some examples described herein, retrieving the two or more observability data sets may include operations, features, means, or instructions for asynchronously restoring, by the DMS, at least one observability data set from the second type of cloud storage to the first type of cloud storage using one or more application programming interfaces (APIs) provided by the cloud storage environment, where at least some of the merged tracing data is from the at least one observability data set restored from the second type of cloud storage.

In some examples described herein, merging the tracing data may include operations, features, means, or instructions for combining the set of time-partitioned data blocks of the two or more observability data sets into a non-time-partitioned visualization of the merged tracing data.

Some examples described herein may further include operations, features, means, or instructions for: retrieving, by an authorized user of the DMS, an authentication token from an identity-based secrets and encryption management system integrated with the DMS; and transmitting, to an endpoint associated with a tracing support library provided by the DMS, a request to fetch, download, extract, or restore the two or more observability data sets from the cloud storage environment, where the request includes the authentication token retrieved from the identity-based secrets and encryption management system.

Some examples described herein may further include operations, features, means, or instructions for: verifying, by the endpoint associated with the tracing support library, an identity of the authorized user based on the authentication token provided with the request and a set of cloud credentials obtained from the identity-based secrets and encryption management system; and retrieving, by the endpoint associated with the tracing support library, the two or more observability data sets from the cloud storage environment using the set of cloud credentials obtained from the identity-based secrets and encryption management system.

In some examples described herein, at least one observability data set includes block storage containing one or more compacted or non-compacted time-partitioned data blocks, write ahead log (WAL) block storage containing one or more partial or full WAL blocks, an append file containing trace data, or a combination thereof.

In some examples described herein, a difference between a trace data retention period and an observability data set collection period corresponds to a duration of overlap between the two or more observability data sets.

In some examples described herein, at least some of the set of time-partitioned data blocks may be immutable. In some examples described herein, the subset of overlapping time-partitioned data blocks correspond to the duration of overlap between the two or more observability data sets.

In some examples described herein, the subset of overlapping time-partitioned data blocks include compacted data blocks, non-compacted data blocks, WAL blocks, an append file, or any combination thereof.

In some examples described herein, overlapping time-partitioned data blocks that correspond to the later time interval may be selected for inclusion within the merged tracing data and overlapping time-partitioned data blocks that correspond to the earlier time interval may be omitted from the merged tracing data.

In some examples described herein, merging the tracing data may include: retaining a first set of write ahead log blocks that correspond to the earlier time interval; and omitting a second set of write ahead log blocks that correspond to the later time interval.

DETAILED DESCRIPTION

Figure 1:
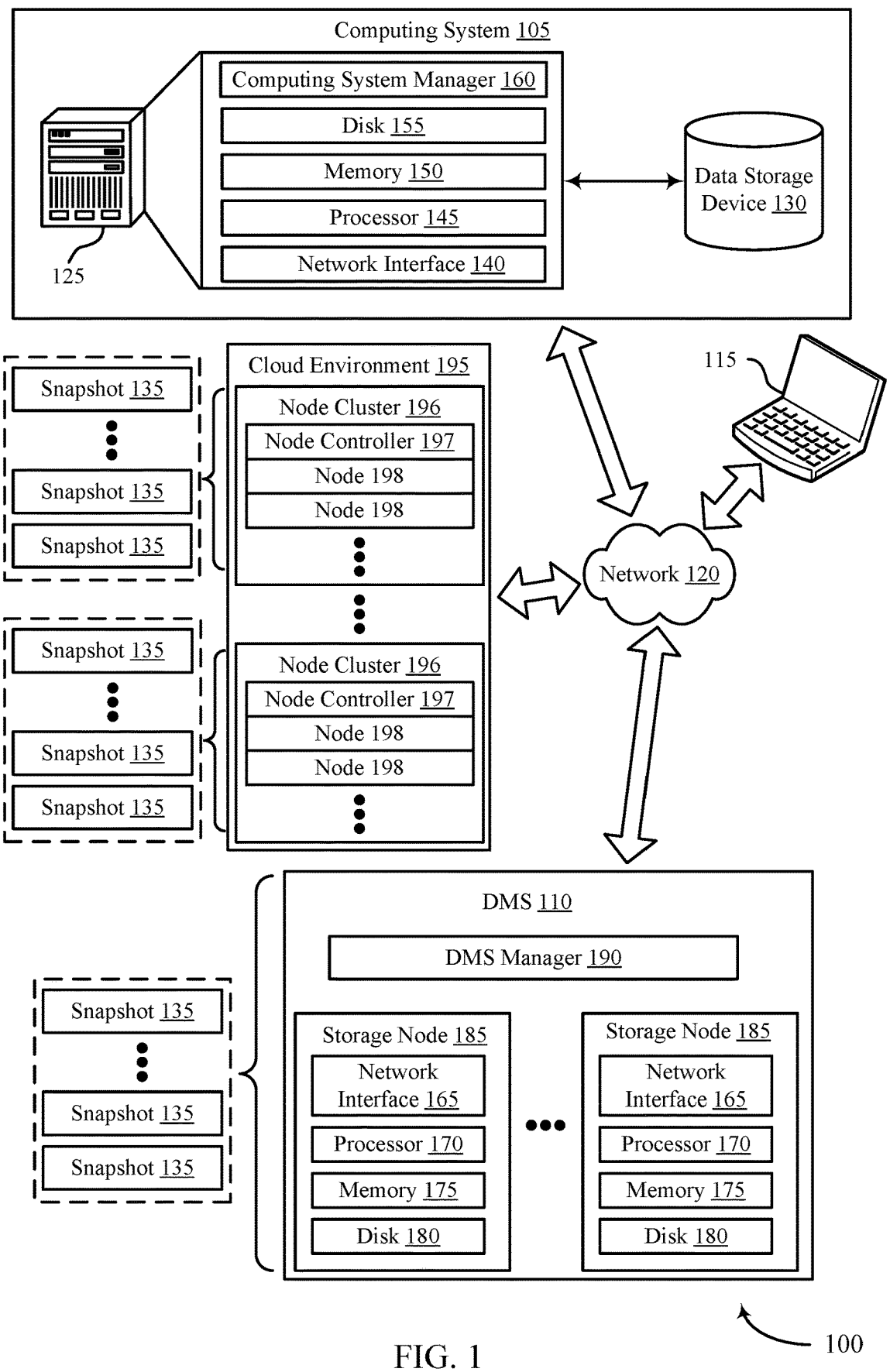
FIGS. 1 through 4 illustrate examples of computing environments that support merging and visualizing observability data sets in accordance with aspects of the present disclosure.

Administrative users of a data management system (DMS) may use observability data, also referred to as tracing data or log tracing information, to detect and debug errors that occur during backup operations performed by nodes in a node cluster of the DMS. Log tracing involves systematically recording events, actions, and states of a particular node to create a log (or trace) of the node's runtime behavior. When an error or unexpected event occurs, developers or system administrators can examine these logs to determine what events contributed to the issue. In some examples, a log tracing service of the DMS (which may be implemented using Grafana Tempo or any suitable tracing support system) may periodically collect observability data from services running on a given node.

The observability data collected by the log tracing service of the DMS may enable system administrators to investigate performance issues associated with a node cluster. In some cases, however, the DMS may be unable to store the observability data for long periods of time (for example, due to the volume of observability data and/or storage constraints of the DMS). As such, it may be difficult for system administrators to debug/investigate relatively long backup operations (such as backup jobs that span multiple days). Moreover, the observability data may be stored in such a way that system administrators are unable to view or otherwise interact with the observability data in a unified manner.

Aspects of the present disclosure generally provide for optimized storage, on-demand retrieval, and dynamic visualization of tracing data across user-specified time ranges. In accordance with the techniques described herein, the DMS may receive an indication of a time range associated with a detected failure or performance issue associated with one or more nodes in a node cluster of the DMS. The time range may span multiple time intervals (e.g., observability data collection periods). Accordingly, the DMS may retrieve, from a cloud storage environment (such as Amazon S3 Cloud Object Storage), two or more observability data sets (also referred to as support bundles) corresponding to the time intervals within the user-specified time range.

The observability data sets may include time-partitioned data blocks that include tracing data associated with operations performed by the one or more nodes during the time range associated with the detected failure or performance issue. The DMS may combine (e.g., merge) the tracing data by selecting a subset of overlapping time-partitioned data blocks, omitting (e.g., dropping) tracing data from a first set of time-partitioned data blocks that correspond to an earlier time interval, and retaining tracing data from a second set of time-partitioned data blocks that correspond to a later time interval. In turn, the DMS may use the merged tracing data to generate a visualization of the operations performed by the one or more nodes during the user-specified time range, thereby enabling developers and/or administrative users to interact with the merged tracing data in a cohesive, unified manner.

FIG. 1 illustrates an example of a computing environment 100 that supports merging and visualizing observability data sets in accordance with aspects of the present disclosure. The computing environment 100 includes a computing system 105, a DMS 110, and one or more computing devices 115, which may be in communication with one another via a network 120. The computing system 105 may generate, store, process, modify, or otherwise use associated data, and the DMS 110 may provide one or more data management services for the computing system 105. For example, the DMS 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the DMS 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components.

A computing device 115 may be used to input information to or receive information from the computing system 105, the DMS 110, or both. For example, a user of the computing device 115 may provide user inputs via the computing device 115, which may result in commands, data, or any combination thereof being communicated via the network 120 to the computing system 105, the DMS 110, or both. Additionally, or alternatively, a computing device 115 may output (e.g., display) data or other information received from the computing system 105, the DMS 110, or both. A user of a computing device 115 may, for example, use the computing device 115 to interact with one or more user interfaces (e.g., graphical user interfaces (GUIs)) to operate or otherwise interact with the computing system 105, the DMS 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone). In some examples, a computing device 115 may be a commercial computing device, such as a server or collection of servers. And in some examples, a computing device 115 may be a virtual device (e.g., a virtual machine). Though shown as a separate device in the example computing environment of FIG. 1, it is to be understood that in some cases a computing device 115 may be included in (e.g., may be a component of) the computing system 105 or the DMS 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may comprise a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may act as an application server or a file server. In general, a server 125 may refer to one or more hardware devices that act as the host in a client-server relationship or a software process that shares a resource with or performs work for one or more clients.

A server 125 may include a network interface 140, processor 145, memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The processor 145 may execute computer-readable instructions stored in the memory 150 in order to cause the server 125 to perform functions ascribed herein to the server 125. The processor 145 may include one or more processing units, such as one or more central processing units (CPUs), one or more graphics processing units (GPUs), or any combination thereof.

The memory 150 may comprise one or more types of memory (e.g., random access memory (RAM), static random access memory (SRAM), dynamic random access memory (DRAM), read-only memory ((ROM), electrically erasable programmable read-only memory (EEPROM), Flash, etc.). Disk 155 may include one or more HDDs, one or more SSDs, or any combination thereof. Memory 150 and disk 155 may comprise hardware storage devices. The computing system manager 160 may manage the computing system 105 or aspects thereof (e.g., based on instructions stored in the memory 150 and executed by the processor 145) to perform functions ascribed herein to the computing system 105. In some examples, the network interface 140, processor 145, memory 150, and disk 155 may be included in a hardware layer of a server 125, and the computing system manager 160 may be included in a software layer of the server 125. In some cases, the computing system manager 160 may be distributed across (e.g., implemented by) multiple servers 125 within the computing system 105.

In some examples, the computing system 105 or aspects thereof may be implemented within one or more cloud computing environments, which may alternatively be referred to as cloud environments. Cloud computing may refer to Internet-based computing, wherein shared resources, software, and/or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 105 or aspects thereof through Software-as-a-Service (SaaS) or Infrastructure-as-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more virtual machines, the resources of which are made available to one or more client devices over a network (e.g., to one or more computing devices 115 over the network 120).

In some examples, the computing system 105 or aspects thereof may implement or be implemented by one or more virtual machines. The one or more virtual machines may run various applications, such as a database server, an application server, or a web server. For example, a server 125 may be used to host (e.g., create, manage) one or more virtual machines, and the computing system manager 160 may manage a virtualized infrastructure within the computing system 105 and perform management operations associated with the virtualized infrastructure. The computing system manager 160 may manage the provisioning of virtual machines running within the virtualized infrastructure and provide an interface to a computing device 115 interacting with the virtualized infrastructure.

For example, the computing system manager 160 may be or include a hypervisor and may perform various virtual machine-related tasks, such as cloning virtual machines, creating new virtual machines, monitoring the state of virtual machines, moving virtual machines between physical hosts for load balancing purposes, and facilitating backups of virtual machines. In some examples, the virtual machines, the hypervisor, or both, may virtualize and make available resources of the disk 155, the memory, the processor 145, the network interface 140, the data storage device 130, or any combination thereof in support of running the various applications. Storage resources (e.g., the disk 155, the memory 150, or the data storage device 130) that are virtualized may be accessed by applications as a virtual disk.

The DMS 110 may provide one or more data management services for data associated with the computing system 105 and may include DMS manager 190 and any quantity of storage nodes 185. The DMS manager 190 may manage operation of the DMS 110, including the storage nodes 185. Though illustrated as a separate entity within the DMS 110, the DMS manager 190 may in some cases be implemented (e.g., as a software application) by one or more of the storage nodes 185. In some examples, the storage nodes 185 may be included in a hardware layer of the DMS 110, and the DMS manager 190 may be included in a software layer of the DMS 110. In the example illustrated in FIG. 1, the DMS 110 is separate from the computing system 105 but in communication with the computing system 105 via the network 120. It is to be understood, however, that in some examples at least some aspects of the DMS 110 may be located within computing system 105. For example, one or more servers 125, one or more data storage devices 130, and at least some aspects of the DMS 110 may be implemented within the same cloud environment or within the same data center.

Storage nodes 185 of the DMS 110 may include respective network interfaces 165, processors 170, memories 175, and disks 180. The network interfaces 165 may enable the storage nodes 185 to connect to one another, to the network 120, or both. A network interface 165 may include one or more wireless network interfaces, one or more wired network interfaces, or any combination thereof. The processor 170 of a storage node 185 may execute computer-readable instructions stored in the memory 175 of the storage node 185 in order to cause the storage node 185 to perform processes described herein as performed by the storage node 185. A processor 170 may include one or more processing units, such as one or more CPUs, one or more GPUs, or any combination thereof. The memory 150 may comprise one or more types of memory (e.g., RAM, SRAM, DRAM, ROM, EEPROM, Flash, etc.). A disk 180 may include one or more HDDs, one or more SDDs, or any combination thereof. Memories 175 and disks 180 may comprise hardware storage devices. Collectively, the storage nodes 185 may in some cases be referred to as a storage cluster or as a cluster of storage nodes 185.

The DMS 110 may provide a backup and recovery service for the computing system 105. For example, the DMS 110 may manage the extraction and storage of snapshots 135 associated with different point-in-time versions of one or more target computing objects within the computing system 105. A snapshot 135 of a computing object (e.g., a virtual machine, a database, a filesystem, a virtual disk, a virtual desktop, or other type of computing system or storage system) may be a file (or set of files) that represents a state of the computing object (e.g., the data thereof) as of a particular point in time. A snapshot 135 may also be used to restore (e.g., recover) the corresponding computing object as of the particular point in time corresponding to the snapshot 135. A computing object of which a snapshot 135 may be generated may be referred to as snappable.

Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the computing object as of a particular point in time. For example, a snapshot 135 may include metadata associated with (e.g., that defines a state of) some or all data blocks included in (e.g., stored by or otherwise included in) the computing object. Snapshots 135 (e.g., collectively) may capture changes in the data blocks over time. Snapshots 135 generated for the target computing objects within the computing system 105 may be stored in one or more storage locations (e.g., the disk 155, memory 150, the data storage device 130) of the computing system 105, in the alternative or in addition to being stored within the DMS 110, as described below.

To obtain a snapshot 135 of a target computing object associated with the computing system 105 (e.g., of the entirety of the computing system 105 or some portion thereof, such as one or databases, virtual machines, or filesystems within the computing system 105), the DMS manager 190 may transmit a snapshot request to the computing system manager 160. In response to the snapshot request, the computing system manager 160 may set the target computing object into a frozen state (e.g., a read-only state). Setting the target computing object into a frozen state may allow a point-in-time snapshot 135 of the target computing object to be stored or transferred.

In some examples, the computing system 105 may generate the snapshot 135 based on the frozen state of the computing object. For example, the computing system 105 may execute an agent of the DMS 110 (e.g., the agent may be software installed at and executed by one or more servers 125), and the agent may cause the computing system 105 to generate the snapshot 135 and transfer the snapshot 135 to the DMS 110 in response to the request from the DMS 110. In some examples, the computing system manager 160 may cause the computing system 105 to transfer, to the DMS 110, data that represents the frozen state of the target computing object, and the DMS 110 may generate a snapshot 135 of the target computing object based on the corresponding data received from the computing system 105.

Once the DMS 110 receives, generates, or otherwise obtains a snapshot 135, the DMS 110 may store the snapshot 135 at one or more of the storage nodes 185. The DMS 110 may store a snapshot 135 at multiple storage nodes 185, for example, for improved reliability. Additionally, or alternatively, snapshots 135 may be stored in some other location connected with the network 120. For example, the DMS 110 may store more recent snapshots 135 at the storage nodes 185, and the DMS 110 may transfer less recent snapshots 135 via the network 120 to a cloud environment (which may include or be separate from the computing system 105) for storage at the cloud environment, a magnetic tape storage device, or another storage system separate from the DMS 110.

Updates made to a target computing object that has been set into a frozen state may be written by the computing system 105 to a separate file (e.g., an update file) or other entity within the computing system 105 while the target computing object is in the frozen state. After the snapshot 135 (or associated data) of the target computing object has been transferred to the DMS 110, the computing system manager 160 may release the target computing object from the frozen state, and any corresponding updates written to the separate file or other entity may be merged into the target computing object.

In response to a restore command (e.g., from a computing device 115 or the computing system 105), the DMS 110 may restore a target version (e.g., corresponding to a particular point in time) of a computing object based on a corresponding snapshot 135 of the computing object. In some examples, the corresponding snapshot 135 may be used to restore the target version based on data of the computing object as stored at the computing system 105 (e.g., based on information included in the corresponding snapshot 135 and other information stored at the computing system 105, the computing object may be restored to its state as of the particular point in time).

Additionally, or alternatively, the corresponding snapshot 135 may be used to restore the data of the target version based on data of the computing object as included in one or more backup copies of the computing object (e.g., file-level backup copies or image-level backup copies). Such backup copies of the computing object may be generated in conjunction with or according to a separate schedule than the snapshots 135. For example, the target version of the computing object may be restored based on the information in a snapshot 135 and based on information included in a backup copy of the target object generated prior to the time corresponding to the target version. Backup copies of the computing object may be stored at the DMS 110 (e.g., in the storage nodes 185) or in some other location connected with the network 120 (e.g., in a cloud environment, which in some cases may be separate from the computing system 105).

In some examples, the DMS 110 may restore the target version of the computing object and transfer the data of the restored computing object to the computing system 105. And in some examples, the DMS 110 may transfer one or more snapshots 135 to the computing system 105, and restoration of the target version of the computing object may occur at the computing system 105 (e.g., as managed by an agent of the DMS 110, where the agent may be installed and operate at the computing system 105).

In response to a mount command (e.g., from a computing device 115 or the computing system 105), the DMS 110 may instantiate data associated with a point-in-time version of a computing object based on a snapshot 135 corresponding to the computing object (e.g., along with data included in a backup copy of the computing object) and the point-in-time. The DMS 110 may then allow the computing system 105 to read or modify the instantiated data (e.g., without transferring the instantiated data to the computing system). In some examples, the DMS 110 may instantiate (e.g., virtually mount) some or all of the data associated with the point-in-time version of the computing object for access by the computing system 105, the DMS 110, or the computing device 115.

In some examples, the DMS 110 may store different types of snapshots 135, including for the same computing object. For example, the DMS 110 may store both base snapshots 135 and incremental snapshots 135. A base snapshot 135 may represent the entirety of the state of the corresponding computing object as of a point in time corresponding to the base snapshot 135. An incremental snapshot 135 may represent the changes to the state—which may be referred to as the delta—of the corresponding computing object that have occurred between an earlier or later point in time corresponding to another snapshot 135 (e.g., another base snapshot 135 or incremental snapshot 135) of the computing object and the incremental snapshot 135. In some cases, some incremental snapshots 135 may be forward-incremental snapshots 135 and other incremental snapshots 135 may be reverse-incremental snapshots 135.

To generate a full snapshot 135 of a computing object using a forward-incremental snapshot 135, the information of the forward-incremental snapshot 135 may be combined with (e.g., applied to) the information of an earlier base snapshot 135 of the computing object along with the information of any intervening forward-incremental snapshots 135, where the earlier base snapshot 135 may include a base snapshot 135 and one or more reverse-incremental or forward-incremental snapshots 135. To generate a full snapshot 135 of a computing object using a reverse-incremental snapshot 135, the information of the reverse-incremental snapshot 135 may be combined with (e.g., applied to) the information of a later base snapshot 135 of the computing object along with the information of any intervening reverse-incremental snapshots 135.

In some examples, the DMS 110 may provide a data classification service, a malware detection service, a data transfer or replication service, backup verification service, or any combination thereof, among other possible data management services for data associated with the computing system 105. For example, the DMS 110 may analyze data included in one or more computing objects of the computing system 105, metadata for one or more computing objects of the computing system 105, or any combination thereof, and based on such analysis, the DMS 110 may identify locations within the computing system 105 that include data of one or more target data types (e.g., sensitive data, such as data subject to privacy regulations or otherwise of particular interest) and output related information (e.g., for display to a user via a computing device 115). Additionally, or alternatively, the DMS 110 may detect whether aspects of the computing system 105 have been impacted by malware (e.g., ransomware).

Additionally, or alternatively, the DMS 110 may relocate data or create copies of data based on using one or more snapshots 135 to restore the associated computing object within its original location or at a new location (e.g., a new location within a different computing system 105). Additionally, or alternatively, the DMS 110 may analyze backup data to ensure that the underlying data (e.g., user data or metadata) has not been corrupted. The DMS 110 may perform such data classification, malware detection, data transfer or replication, or backup verification, for example, based on data included in snapshots 135 or backup copies of the computing system 105, rather than live contents of the computing system 105, which may beneficially avoid adversely affecting (e.g., infecting, loading, etc.) the computing system 105.

In some examples, the DMS 110, and in particular the DMS manager 190, may be referred to as a control plane. The control plane may manage tasks, such as storing data management data or performing restorations, among other possible examples. The control plane may be common to multiple customers or tenants of the DMS 110. For example, the computing system 105 may be associated with a first customer or tenant of the DMS 110, and the DMS 110 may similarly provide data management services for one or more other computing systems associated with one or more additional customers or tenants. In some examples, the control plane may be configured to manage the transfer of data management data (e.g., snapshots 135 associated with the computing system 105) to a cloud environment 195 (e.g., Microsoft Azure or Amazon Web Services). In addition, or as an alternative, to being configured to manage the transfer of data management data to the cloud environment 195, the control plane may be configured to transfer metadata for the data management data to the cloud environment 195. The metadata may be configured to facilitate storage of the stored data management data, the management of the stored management data, the processing of the stored management data, the restoration of the stored data management data, and the like.

Each customer or tenant of the DMS 110 may have a private data plane. As described herein, a data plane may include a location at which customer or tenant data is stored. For example, each private data plane for each customer or tenant may include a node cluster 196 across which data (e.g., data management data, metadata for data management data, etc.) for a customer or tenant is stored. Each node cluster 196 may include a node controller 197 which manages the nodes 198 of the node cluster 196. As an example, a node cluster 196 for one tenant or customer may be hosted on Microsoft Azure, and another node cluster 196 may be hosted on Amazon Web Services. In another example, multiple separate node clusters 196 for multiple different customers or tenants may be hosted on Microsoft Azure. Separating each customer or tenant's data into separate node clusters 196 provides fault isolation for the different customers or tenants and provides security by limiting access to data for each customer or tenant.

The control plane (e.g., the DMS 110, and specifically the DMS manager 190) manages tasks, such as storing backups or snapshots 135 or performing restorations, across the multiple node clusters 196. For example, as described herein, a node cluster 196 may be associated with the first customer or tenant associated with the computing system 105. The DMS 110 may obtain (e.g., generate or receive) and transfer the snapshots 135 associated with the computing system 105 to the node cluster 196 in accordance with a service level agreement for the first customer or tenant associated with the computing system 105. For example, a service level agreement may define backup and recovery parameters for a customer or tenant such as snapshot generation frequency, which computing objects to backup, where to store the snapshots 135 (e.g., which private data plane), and how long to retain snapshots 135. As described herein, the control plane may provide data management services for another computing system associated with another customer or tenant. For example, the control plane may generate and transfer snapshots 135 for another computing system associated with another customer or tenant to the node cluster 196 in accordance with the service level agreement for the other customer or tenant.

To manage tasks, such as storing backups or snapshots 135 or performing restorations, across the multiple node clusters 196, the control plane (e.g., the DMS manager 190) may communicate with the node controllers 197 for the various node clusters via the network 120. For example, the control plane may exchange communications for backup and recovery tasks with the node controllers 197 in the form of transmission control protocol (TCP) packets via the network 120.

In accordance with the techniques described herein, the DMS 110 may retrieve, from a cloud environment 195 accessible to the DMS 110, two or more observability data sets associated with a set of time intervals within a selected time range. The two or more observability data sets may contain a set of time-partitioned data blocks that include tracing data associated with operations performed by one or more nodes 198 of a node cluster 196 of the DMS 110 during the selected time range. Accordingly, a triage service of the DMS 110 may combine (e.g., merge) the tracing data by selecting a first subset of overlapping time-partitioned data blocks that correspond to an overlapping time interval between the set of time intervals, omitting a second subset of the overlapping time-partitioned data blocks that correspond to the overlapping time interval, and retaining one or more non-overlapping time-partitioned data blocks that correspond to an earlier time interval or a later time interval of the set of time intervals. Thereafter, the DMS 110 may transmit data corresponding to a visualization of the merged tracing data associated with the selected time range. For example, the DMS 110 may transmit the data to a computing device 115 associated with developers and/or administrative users of the DMS 110, and visualization of the merged tracing data associated with the selected time range may be presented on a display at the computing device 115.

Figure 2:
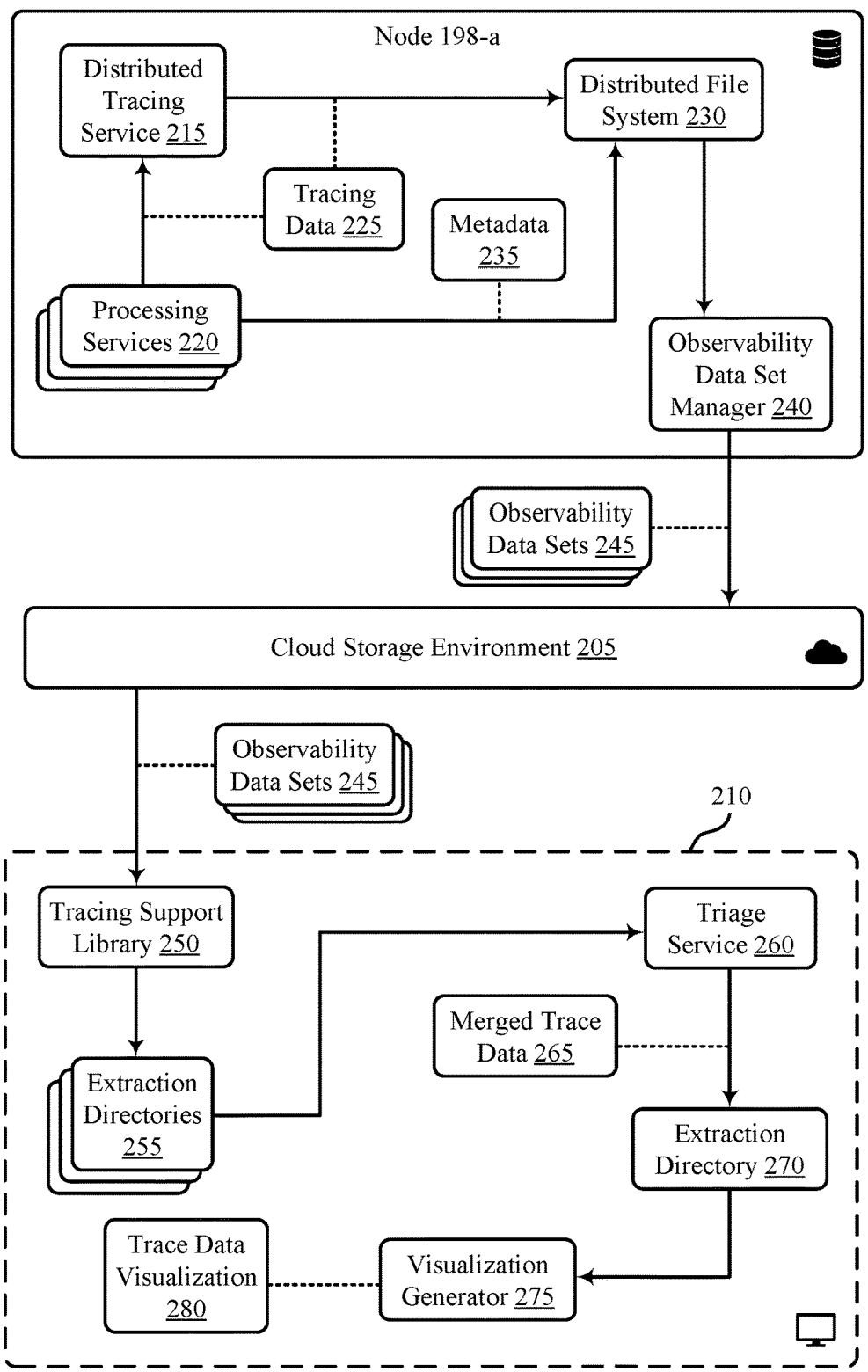

FIG. 2 shows an example of a computing environment 200 that supports merging and visualizing observability data sets in accordance with aspects of the present disclosure. The computing environment 200 may implement one or more aspects of the computing environment 100. For example, the computing environment 200 includes a node 198-*a*, which may be an example of one or more of the nodes 198 shown and described with reference to FIG. 1. Likewise, the computing environment 200 includes a cloud storage environment 205, which may be an example of the cloud environment 195 shown and described with reference to FIG. 1. The computing environment 200 also includes a sub-system 210 (such as a software development space), which may be accessible to one or more computing devices 115 associated with developers and/or administrative users of the DMS 110.

In the example of FIG. 2, a distributed tracing service 215 of the DMS 110 (such as Grafana Tempo) may periodically collect observability data from one or more processing services 220 running on the node 198-*a*. The observability data may include tracing data 225, logs, metadata 235, etc. The distributed tracing service 215 may push the observability data to a distributed file system 230 of the DMS 110, which may relay the observability data to an observability data set manager 240 (also referred to as a support bundle generator/uploader). Accordingly, the observability data set manager 240 may aggregate/consolidate the observability data into observability data sets 245 and upload the observability data sets 245 to the cloud storage environment 205.

Within the cloud storage environment 205, the observability data sets 245 may be stored in a first type of cloud storage (such as hot storage) for a first time period, after which the observability data sets 245 may be moved to a second type of cloud storage (such as cold storage). Once archived, the observability data sets 245 may be retained in the second type of cloud storage for a second time period configured/defined by a cloud retention policy of the DMS 110. The first type of cloud storage may be suitable for data that is frequently used or accessed on a recurring basis. The first type of cloud storage may provide relatively low-latency access, which may be desirable for storing critical or time-sensitive data (such as active databases, frequently accessed files, or real-time analytics). In contrast, the second type of cloud storage may be suitable for data that is accessed infrequently or retained for a relatively long time. The second type of cloud storage may be more cost-effective than the first type of cloud storage, which may be desirable for archiving historical data, backups, regulatory compliance data, etc.

To download, extract, retrieve, and/or restore the observability data sets 245 from the cloud storage environment 205, an authorized user of the DMS 110 may obtain an authentication token from a vault (such as an identity-based secrets and encryption management system) that is integrated with or otherwise accessible to the DMS 110. The authorized user may obtain the authentication token via a user interface (UI), command line interface (CLI), or application programming interface (API) provided by the vault. As described herein, the vault may verify the identity of the authorized user and return an authentication token, which enables the authorized user to access one or more secrets (such as a set of cloud credentials) protected by the vault. In some implementations, a computing device 115 of the authorized user may cache the authentication token such that the computing device 115 can re-use the authentication token without additional calls to the vault.

In turn, the authorized user may transmit (via the computing device 115) an API call to an endpoint associated with the tracing support library 250. As described herein, an "endpoint" refers to an identifier of a network entity (such as a server, physical/virtual machine, data center, or the like), application, or service that provides access to a particular resource (such as the tracing support library 250). The API call may include the authentication token and a request to fetch, download, extract, and/or restore two or more observability data sets 245 from the cloud storage environment 205. The API call may also indicate a selected time range that spans one or multiple time intervals. In some implementations, the selected time range may correspond to a detected failure or performance issue associated with the node 198-*a*.

The DMS 110 may use the tracing support library 250 to verify the identity of the authorized user (for example, based on the authentication token and other authentication details provided with the request). More specifically, the DMS 110 may use the tracing support library 250 to fetch authentication details for the authorized user, check the authorization status of the authorized user, and fetch a set of cloud credentials from the vault using the details provided by the authorized user. The tracing support library 250 of the DMS 110 may use the set of cloud credentials to access the cloud storage environment 205 (for example, via one or more cloud APIs).

The DMS 110 may use the tracing support library 250 to retrieve two or more observability data sets 245 from the cloud storage environment 205. In some implementations, to retrieve the two or more observability data sets 245, the tracing support library 250 may use one or more cloud APIs exposed by the cloud storage environment 205 to asynchronously restore one or more of the observability data sets 245 from the second type of cloud storage to the first type of cloud storage. The two or more observability data sets 245 may be associated with respective time intervals within the selected time range. As described herein, the two or more observability data sets 245 may contain various time-partitioned data blocks that include tracing data 225 associated with operations performed by the node 198-*a* during the selected time range.

The DMS 110 may use the tracing support library 250 to process the two or more observability data sets 245 within the sub-system 210. For example, the DMS 110 may use the tracing support library 250 to download the two or more observability data sets 245 from the cloud storage environment 205 and extract (e.g., write) the tracing data 225 from the two or more observability data sets 245 into extraction directories 255 that are accessible to the triage service 260. As described herein, each observability data set 245 may include a block storage component containing one or more compacted or non-compacted time-partitioned data blocks, a write ahead log (WAL) block storage component containing one or more partial or full WAL blocks, an append file containing trace data, or a combination thereof.

The triage service 260 of the DMS 110 may combine (e.g. merge) the tracing data 225 present in the two or more observability data sets 245 by selecting a first subset of overlapping time-partitioned data blocks that correspond to an overlapping time interval between the set of time intervals, omitting a second subset of the overlapping time-partitioned data blocks that correspond to the overlapping time interval, and retaining one or more non-overlapping time-partitioned data blocks that correspond to an earlier time interval or a later time interval of the set of time intervals. In some implementations, the overlapping time-partitioned data blocks may result from a difference between a trace data retention period and an observability data set collection period of the DMS 110. The overlapping time-partitioned data blocks may include compacted data blocks, non-compacted data blocks, WAL blocks, an append file, or any combination thereof.

Accordingly, the triage service 260 may transmit data associated with a visualization 280 of the merged tracing data 265 for the selected time range, thereby enabling the authorized user to visualize operations performed by the node 198-a during the selected time range. In some implementations, the triage service 260 may save the merged tracing data 265 to an extraction directory 270, and a visualization generator 275 (which, in some implementations, may be supported by the distributed tracing service 215) may use the merged tracing data 265 in the extraction directory 270 to generate a unified (e.g., non-time-partitioned) visualization 280 of the merged tracing data 265. Accordingly, the computing device 115 associated with the authorized user may render the visualization 280 of the merged tracing data 265, for example, via a UI of the distributed tracing service 215 (such as Grafana Tempo).

Figure 3:
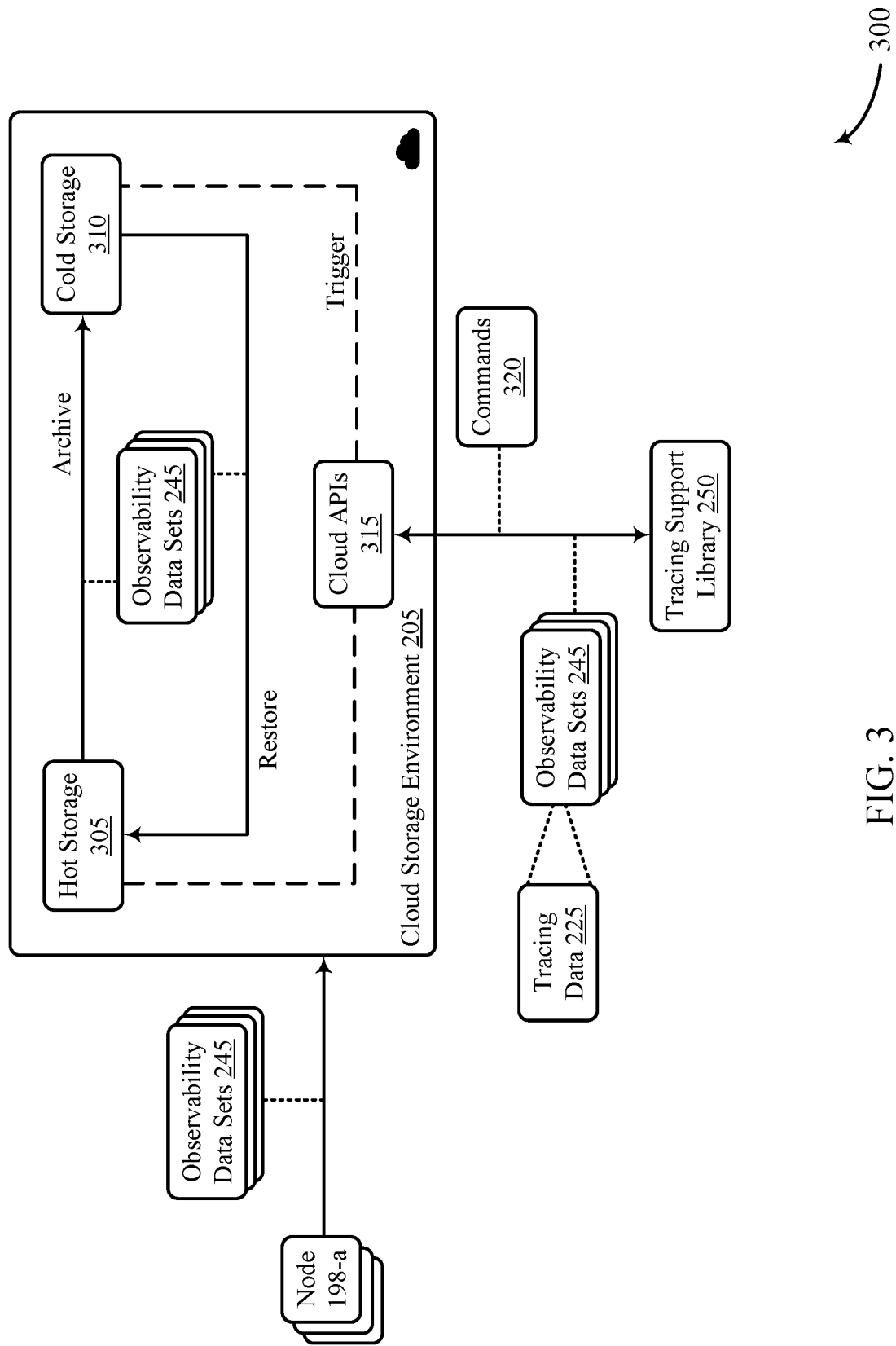

FIG. 3 shows an example of a computing environment 300 that supports merging and visualizing observability data sets in accordance with aspects of the present disclosure. The computing environment 300 may implement one or more aspects of the computing environment 100 and/or the computing environment 200, as shown and described with reference to FIGS. 1 and 2. For example, the computing environment 300 includes a cloud storage environment 205 (such as Amazon S3), observability data sets 245, a tracing support library 250, and a node 198-a, which may be examples of corresponding elements shown and described with reference to FIGS. 1 and 2. In the computing environment 300, an authorized user of the DMS 110 may leverage the tracing support library 250 to interact with the cloud storage environment 205 via one or more cloud APIs 315 exposed by the cloud storage environment 205.

Within a node cluster 196 (also referred to as a cloud data management (CDM) cluster), a distributed tracing service 215 may collect observability data from multiple processing services 220 running on the node cluster 196. Collecting observability data enables administrators and developers to investigate performance issues that arise on the node cluster 196. In some cases, however, the DMS 110 may be unable to retain observability data for long periods of time (for example, due to the volume of observability data collected and/or the number of storage resources available to the DMS 110). As such, the retention period for observability data on some node clusters 196 may be relatively short (e.g., 1-7 days), which may make it difficult for administrators/developers to investigate performance issues that occur before the retention period.

To improve the accessibility of observability data, the DMS 110 may upload the observability data to elastic (e.g., dynamic) cloud storage in a time-partitioned manner. For instance, if a node 198-a is configured to upload observability data every day, an observability data set manager 240 of the node 198-a may upload the data generated since the last upload (approximately). However, uploading time-partitioned observability data may present challenges for querying observability data when performance investigations involve observability data spanning multiple time intervals (e.g., one or more days).

In accordance with one or more aspects of the present disclosure, the computing environment 300 may support techniques for efficiently merging observability data from a cloud storage environment 205 in a time-partitioned manner such that users/developers can query the observability data in a unified manner. The techniques described herein may enable users to run performance investigations of operations that span multiple time intervals (such as resource-intensive backup jobs). The described techniques include collecting tracing data 225 on the node 198-a, uploading the tracing data 225 to the cloud storage environment 205 (in the form of observability data sets 245), managing the storage lifecycle of the observability data sets 245, downloading/extracting the tracing data 225 from the observability data sets 245 retrieved from the cloud storage environment 205, and merging the tracing data 225 across time. The described techniques may enable users to download observability data based on a selected time range (such as a time window for a performance investigation), merge the downloaded observability data, and visualize the merged observability data via a distributed tracing service 215 (such as Grafana Tempo).

In some implementations, observability data may have a relatively low read to write ratio. For example, a relatively large volume of observability data may be collected/written, while a relatively small subset of the observability data may be read/used. Collecting a large quantity of observability data may enable developers/users to accurately diagnose performance issues. To support efficient observability data management, the DMS 110 may transfer the lifecycle of the observability data to the cloud storage environment 205. For example, the DMS 110 may store the observability data in the cloud storage environment 205 with greater efficiency by maintaining recently collected observability data in hot storage 305 for a first time duration (such as 20 days) and retaining older data (e.g., observability data that was collected more than 20 days ago) in cold storage 310. Dynamically managing the lifecycle of observability data within the cloud storage environment 205 may enable the DMS 110 to increase the time range of observability from a shorter time period (e.g., 7 days) to a longer time period (e.g., a number of years) defined/configured by a cloud retention policy of the DMS 110.

Aspects of the present disclosure may also enable users to visualize tracing data 225 that is stored in a time-partitioned manner in the cloud storage environment 205. To support this functionality, the DMS 110 may use the tracing support library 250 to download (from the cloud storage environment 205) two or more observability data sets 245 that correspond to a specific time duration of interest. The tracing support library 250 (also referred to as a support bundle library) may enable users to extract traces, stats, and/or process logs by leveraging one or more cloud APIs 315 provided by the cloud storage environment 205. The tracing support library 250 may interact with the one or more cloud APIs 315 by issuing commands (such as get bundle list, restore bundles, get restore status, download bundles) to the cloud APIs 315. In some implementations, if the desired/target observability data sets 245 are stored in cold storage 310, the tracing support library 250 may use the one or more cloud APIs 315 to asynchronously restore the observability data sets 245 from the cold storage 310 to the hot storage 305, such that the observability data sets 245 can be downloaded. Subsequently, a triage service 260 of the DMS 110 may merge the tracing data on disk and present a unified (e.g., abstracted, non-time-partitioned) visualization 280 of the tracing data 225, which was originally collected and/or stored in a time-partitioned manner.

Figure 4:
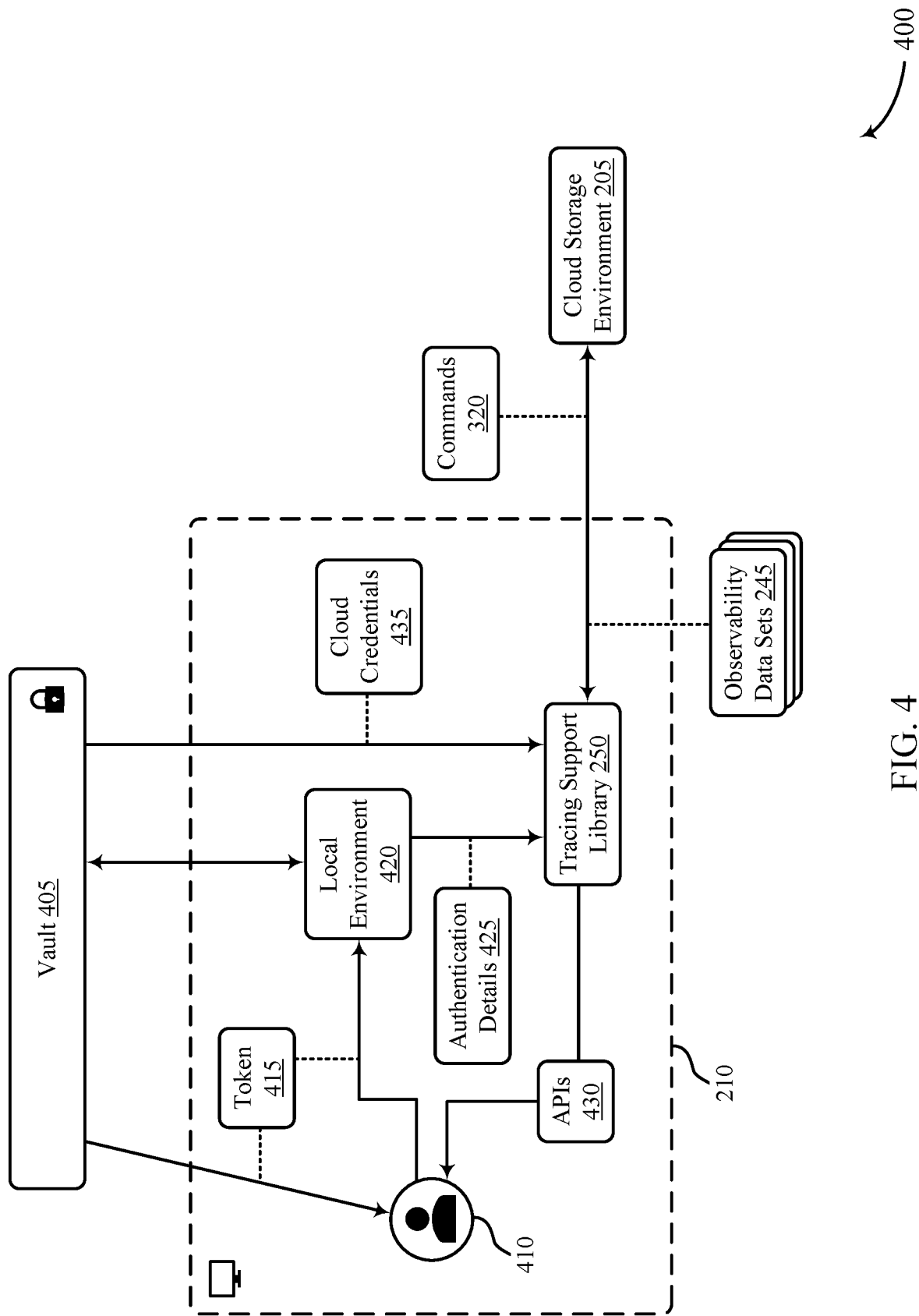

FIG. 4 shows an example of a computing environment 400 that supports merging and visualizing observability data sets in accordance with aspects of the present disclosure. The computing environment 400 may implement one or more aspects of the computing environments shown and described with reference to FIG. 1 through 3. For example, the computing environment 400 includes a cloud storage environment 205 (such as Amazon S3 or any suitable cloud service provider), a tracing support library 250, and a sub-system 210 (such as a software development space), which may be examples of corresponding elements shown and described with reference to FIGS. 1 through 3. The computing environment 400 also includes a vault 405 (such as an identity-based secrets and encryption management system), which may be integrated with or otherwise accessible to the DMS 110.

Prior to accessing the tracing support library 250, an authorized user 410 of the DMS 110 may obtain an authentication token 415 from the vault 405, which serves as a secret store and authorization service for the DMS 110. The vault 405 may check to see whether the authorized user 410 has access to the secrets (for example, cloud credentials) stored on the queried path. If these checks are successful, the vault 405 may return the authentication token 415, which enables the authorized user 410 to programmatically access the stored secrets. The authorized user 410 may obtain the authentication token 415 via a UI, CLI, or API provided by the vault 405. The vault 405 may validate the authentication token 415 and fetch other authentication details 425 using a shield provided by a software development kit (SDK) of the vault 405. In some implementations, the authorized user 410 may pre-authenticate (using the vault 405) and cache the authentication token 415 in a local environment 420 (for example, on a computing device 115 of the authorized user 410) such that the authentication token 415 can be re-used without additional calls to the vault 405.

Accordingly, the authorized user 410 may communicate with the tracing support library 250 via one or more APIs 430. For example, the authorized user 410 may transmit an API call to an endpoint associated with the tracing support library 250. As described herein, an "endpoint" refers to an identifier of a network entity (such as a server, physical/virtual machine, data center, computing device, or the like), application, or service that provides access to a particular resource (such as the tracing support library 250). The API call may include the authentication token 415 and a request to fetch, download, extract, and/or restore two or more observability data sets 245 from the cloud storage environment 205. The API call may also indicate a selected time range that spans one or multiple time intervals. In some implementations, the selected time range may correspond to a detected failure or performance issue associated with the node 198-a.

In turn, the tracing support library 250 may verify the identity of the authorized user 410 based on the authentication token 415 and other authentication details provided with the API call. For example, the tracing support library 250 may fetch authentication details for the authorized user 410, check the authorization status of the authorized user 410, and fetch a set of cloud credentials 435 from the vault 405 using the information provided by the authorized user 410. The tracing support library 250 may use the set of cloud credentials 435 to access the cloud storage environment 205. For example, the tracing support library 250 may send one or more commands 320 (e.g., fetch support bundle list, download/extract/restore from cold storage across a range of dates) to the cloud storage environment 205 via one or more cloud APIs 315 provided by the cloud storage environment 205.

Accordingly, the tracing support library 250 may retrieve two or more observability data sets 245 from the cloud storage environment 205. In some implementations, to retrieve the two or more observability data sets 245, the tracing support library 250 may use the one or more cloud APIs 315 exposed by the cloud storage environment 205 to asynchronously restore one or more of the observability data sets 245 from cold storage 310 (e.g., a second type of cloud storage) to hot storage 305 (e.g., a first type of cloud storage). The two or more observability data sets 245 may be associated with respective time intervals within the selected time range. As described herein, the two or more observability data sets 245 may contain various time-partitioned data blocks that collectively include tracing data 225 associated with operations performed by the node 198-a during the selected time range.

Figure 5:
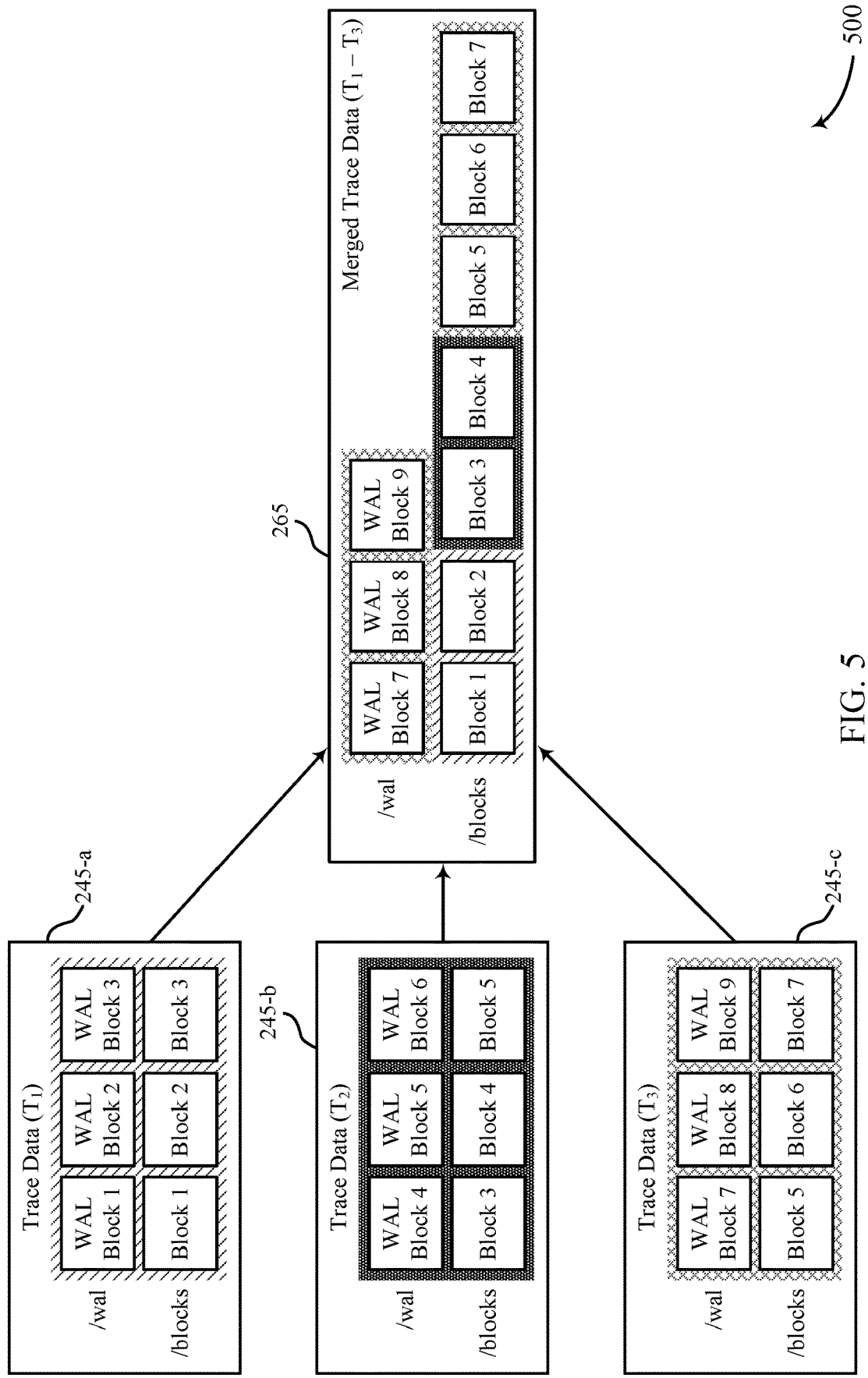
FIGS. 5 and 6 show examples of data merging schemes that support merging and visualizing observability data sets in accordance with aspects of the present disclosure.

FIG. 5 shows an example of a data merging scheme 500 that supports merging and visualizing observability data sets in accordance with aspects of the present disclosure. The data merging scheme 500 may implement one or more aspects of the computing environments shown and described with reference to FIGS. 1 through 4. For example, the data merging scheme 500 includes an observability data set 245-a associated with a first time interval ($T_1$), an observability data set 245-b associated with a second time interval ($T_2$), and an observability data set 245-c associated with a third time interval ($T_3$). Each of the observability data sets 245 may contain various time-partitioned data blocks (referred to hereinafter as blocks) that include tracing data 225 for a particular time interval. In accordance with aspects of the present disclosure, a triage service 260 of the DMS 110 may combine (e.g., merge) blocks from the observability data sets 245 to create merged tracing data 265 for a selected time range that spans multiple time intervals (e.g., $T_1$ through $T_3$)

Tracing data 225 collected by the distributed tracing service 215 of the DMS 110 may include WAL storage (e.g., /wal) and block storage (e.g., /blocks). When a new trace/span is received, the distributed tracing service 215 adds the new trace/span to WAL in an append file (e.g., wal/<append file>). Periodically, the distributed tracing service 215 may transfer tracing data 225 from the append file to WAL blocks (e.g., based on the time duration and block size configuration) and move WAL blocks to block storage. Once a block is written to block storage, the block is immutable. In other words, the state of the block cannot be modified after the block is written to block storage. A block is identified by a unique ID (e.g., the directory name following blocks/). A block may contain multiple files, such as a data file, an index file, a metadata file, etc.

Periodically, the distributed tracing service 215 may use a compactor to compact multiple blocks and create new compacted blocks containing all the observability data from the blocks being compacted. The distributed tracing service 215 may also delete non-compacted and/or compacted blocks from block storage based on a retention policy of the DMS 110. At a given time, an observability data set 245 (also referred to as a support bundle) may include compacted and/or non-compacted blocks present in block storage, a partial/full block present in WAL storage, an append file containing some traces, or any combination thereof.

The data merging scheme 500 shown and described with reference to FIG. 5 illustrates how the triage service 260 may combine (e.g., merge) two consecutive support bundles S1 and S2, where S2 corresponds to a later time interval and S1 corresponds to an earlier time interval. If, for example, the trace retention period of S1/S2 is 30 hours, and the support bundle collection period is 24 hours, there may be a 6 hour interval of overlap between S1 and S2 (as shown and described with reference to FIG. 6). Within this interval, all compacted blocks of S1 may be identical to those in S2. Any non-compacted blocks in S1 may be compacted in S2. Any block in WAL storage of S1 may be moved to block storage and compacted in S2. Any data in the append file of S1 may be moved to block storage in S2 for the following time window.

For the overlapping time period between S1 and S2, data present in block storage of S2 may be a superset of the data present in the block storage and/or WAL storage of S1. For the time interval of S1 that precedes the retention period of S2, the corresponding data will be present only in the block storage of S1. For the time interval of S2 which is after the creation time of S1, the corresponding data will be present only in the block storage and WAL storage of S2. Thus, to merge S1 and S2, the triage service 260 merges the block storage from S1 and S2 (e.g., via rsync), drops (e.g., discards or omits) the WAL storage from S1, and retains the WAL storage from S2. If there are blocks common to both S1 and S2, the triage service 260 may retain the copy from S2. The result/output of these operations may be written to a merged storage location (such as the extraction directory 270), which contains all tracing data 225 from S1 and S2, without any loss.

Figure 6:
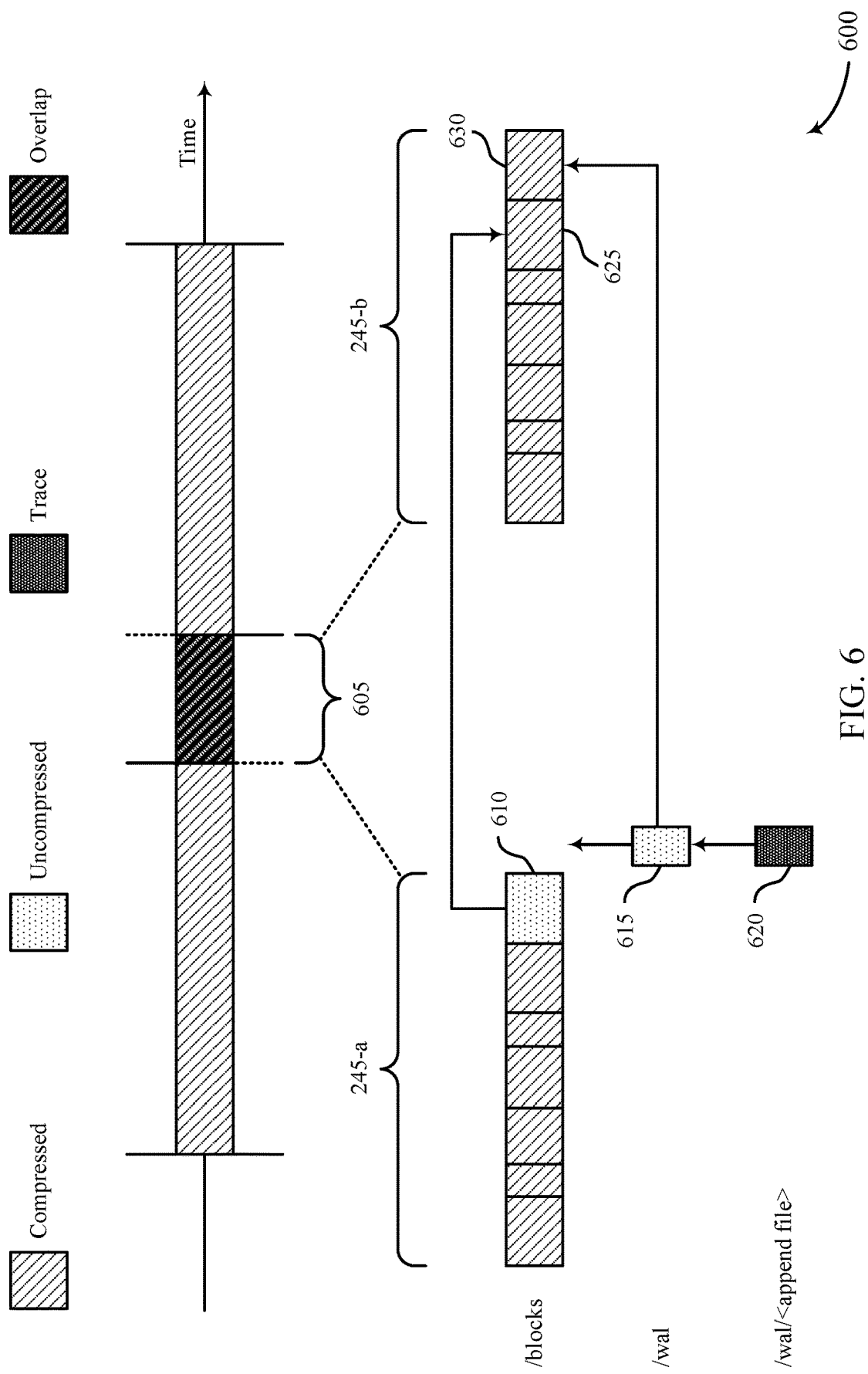

In the example of FIG. 6, the triage service 260 may combine the observability data set 245-a (S1), the observability data set 245-b (S2), and the observability data set 245-c (S3) to create merged tracing data 265 for a selected time range ($T_1$ through $T_3$). For the time interval of S1 that precedes the retention period of S2 ($T_1$-$T_2$), the triage service 260 may retain the corresponding blocks (Block 1 and Block 2) from the block storage of S1. Likewise, for the interval of S2 that precedes the retention period of S3 and succeeds/follows the creation time of S1 ($T_2$-$T_1$-$T_3$), the triage service 260 may retain the corresponding blocks (Block 4) from block storage of S2. For the time interval of S3 that occurs after the creation time of S2 ($T_3$-$T_2$), the triage service 260 may retain the corresponding blocks from block storage (Block 6, Block 7) and WAL storage (WAL Block 7, WAL Block 8, WAL Block 9) of S3. For the period of overlap between S1 and S2 ($T_1 \cap T_2$), the triage service 260 may retain the corresponding blocks (Block 3) from block storage of S2 and drop those from S1. Similarly, for the period of overlap between S2 and S3 ($T_3 \cap T_2$), the triage service 260 may retain the corresponding blocks (Block 5) from block storage of S3 and drop those from S2.

FIG. 6 shows an example of a data merging scheme 600 that supports merging and visualizing observability data sets in accordance with aspects of the present disclosure. The data merging scheme 600 may implement one or more aspects of the computing systems and/or data merging schemes shown and described with reference to FIGS. 1 through 5. For example, the data merging scheme 600 includes an observability data set 245-a (S1) associated with a first time interval ($T_1$) and an observability data set 245-b (S2) associated with a second time interval ($T_2$). Each of the observability data sets 245 may contain various time-partitioned data blocks (referred to hereinafter as blocks) that include tracing data 225 for a particular time interval. In accordance with aspects of the present disclosure, a triage service 260 of the DMS 110 may combine (e.g., merge) blocks from the observability data sets 245 to create merged tracing data 265 for a selected time range that spans multiple time intervals (e.g., $T_1$ through $T_3$)

As described herein, tracing data 225 collected by the distributed tracing service 215 of the DMS 110 may include WAL storage (e.g., /wal) and block storage (e.g., /blocks). When a new trace 620 is received, the distributed tracing service 215 adds the trace 620 to WAL in an append file (e.g., wal/<append file>). Periodically, the distributed tracing service 215 may transfer data from the append file to a WAL block 615 (e.g., based on the time duration and block size configuration) and move the WAL block 615 to block storage. Once a block is written to block storage, the block is immutable (barring deletion). A block is identified by a unique ID (e.g., the directory name following blocks/). A block may contain multiple files, such as a data file, an index file, a metadata file, etc.

Periodically, the distributed tracing service 215 may use a compactor to compact multiple blocks and create new compacted blocks containing all the observability data from the blocks being compacted. The distributed tracing service 215 may also delete non-compacted and/or compacted blocks from block storage based on a retention policy of the DMS 110. At a given time, an observability data set 245 (also referred to as a support bundle) may include compacted and/or non-compacted blocks present in block storage, a partial/full block 615 present in WAL storage, an append file containing some traces 620, or any combination thereof.

The data merging scheme 600 shown and described with reference to FIG. 6 illustrates how the triage service 260 may combine (e.g., merge) two consecutive support bundles S1 and S2, where S2 corresponds to a later time interval and S1 corresponds to an earlier time interval. If, for example, the trace retention period of S1/S2 is 30 hours, and the support bundle collection period is 24 hours, there may be an overlapping time interval 605 of 6 hours between S1 and S2 (as shown in the example of FIG. 6). Within the overlapping time interval 605, all compacted blocks of S1 may be identical to those in S2. Any non-compacted blocks in S1 may be compacted in S2. For example, a non-compacted block 610 in S1 may be compacted to block 625 in S2. Any block in WAL storage of S1 (e.g., WAL block 615) may be moved to block storage (e.g., block 630) and compacted in S2. Any data in the append file of S1 (e.g., trace 620) may be moved to block storage in S2 for the following time window.

For the overlapping time interval 605 between S1 and S2, data present in block storage of S2 may be a superset of the data present in the block storage and/or WAL storage of S1.

For the time interval of S1 that precedes the retention period of S2, the corresponding data will be present only in the block storage of S1. For the time interval of S2 which is after the creation time of S1, the corresponding data will be present only in the block storage and WAL storage of S2. Thus, to merge S1 and S2, the triage service 260 merges the block storage from S1 and S2 (e.g., via rsync), drops (e.g., discards, omits) the WAL storage from S1, and retains the WAL storage from S2. If there are blocks common to both S1 and S2, the triage service 260 may retain the copy from S2. The result/output of these operations may be written to a merged storage location (such as the extraction directory 270), which contains all tracing data 225 from S1 and S2, without any loss.

Figure 7:
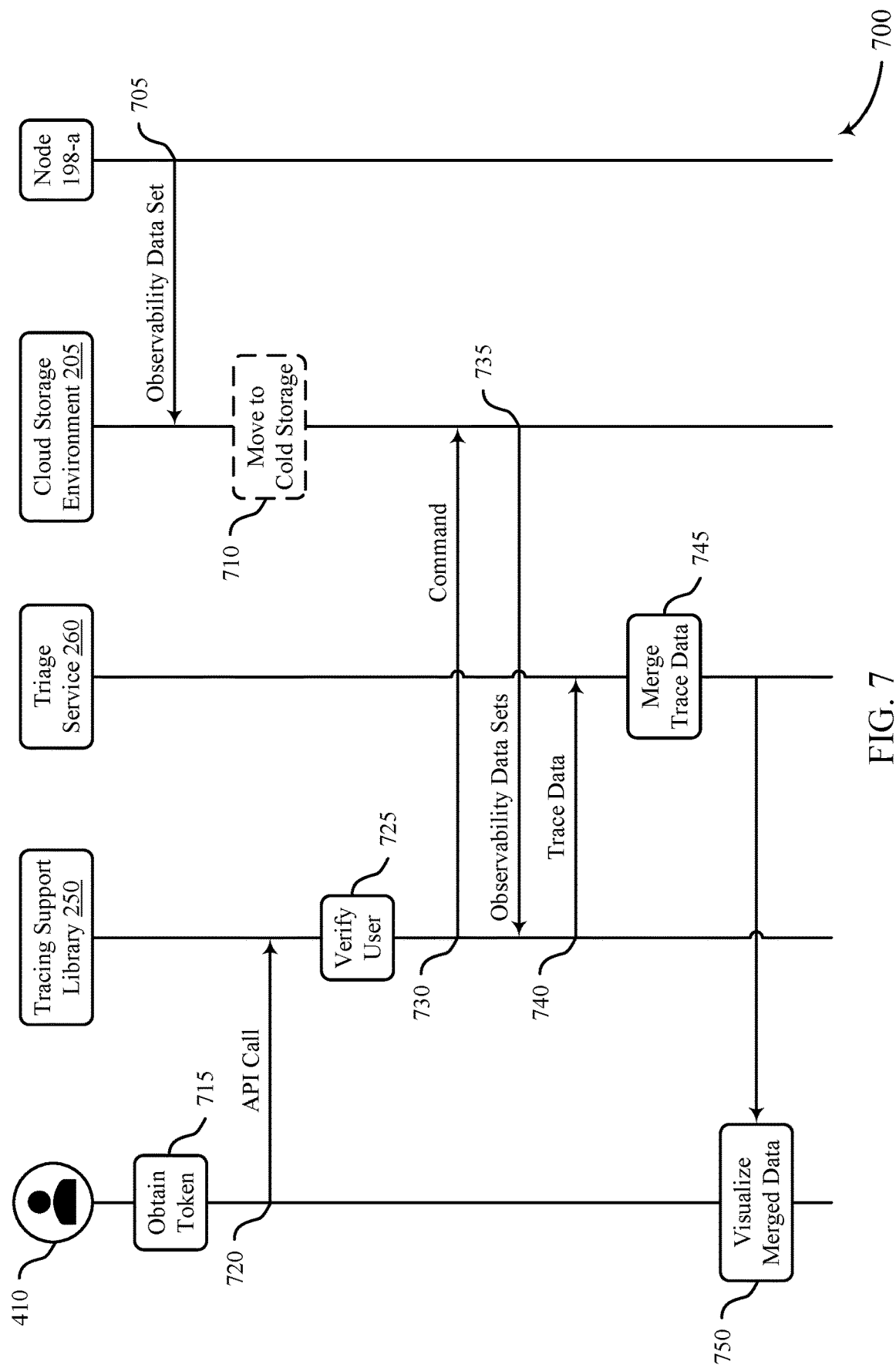
FIG. 7 shows an example of a process flow that supports merging and visualizing observability data sets in accordance with aspects of the present disclosure.

FIG. 7 shows an example of a process flow 700 that supports merging and visualizing observability data sets in accordance with aspects of the present disclosure. The process flow 700 may implement various aspects of the computing environments and/or data merging schemes shown and described with reference to FIGS. 1 through 6. For example, the process flow 700 includes an authorized user 410 (such as a developer or administrative user of the DMS 110), a tracing support library 250, a triage service 260, a cloud storage environment 205, and a node 198-*a*, which may be examples of corresponding elements shown and described with reference to FIGS. 1 through 6. In the following description of the process flow 700, operations between the authorized user 410, the tracing support library 250, the triage service 260, the cloud storage environment 205, and the node 198-*a* may be added, omitted, or performed in a different order (with respect to the exemplary order shown).

At 705, a distributed tracing service 215 of the DMS 110 (such as Grafana Tempo) may periodically collect observability data from one or more processing services 220 running on the node 198-*a*. The observability data may include tracing data 225, logs, metadata 235, etc. The distributed tracing service 215 may push the observability data to a distributed file system 230 of the DMS 110, which may relay the observability data to an observability data set manager 240 (also referred to as a support bundle generator/uploader). Accordingly, the observability data set manager 240 may aggregate/consolidate the observability data into observability data sets 245 and upload the observability data sets 245 to the cloud storage environment 205.

Within the cloud storage environment 205, the observability data sets 245 may be stored in a first type of cloud storage (such as hot storage 305) for a first time period, after which the observability data sets 245 may be moved from the first type of cloud storage to a second type of cloud storage (such as cold storage 310). Once archived (at 710), the observability data sets 245 may be retained in the second type of cloud storage for a second time period configured/defined by a cloud retention policy of the DMS 110. The first type of cloud storage may be suitable for data that is frequently used or accessed on a recurring basis. The first type of cloud storage may provide relatively low-latency access, which may be desirable for storing critical or time-sensitive data (such as active databases, frequently accessed files, or real-time analytics). In contrast, the second type of cloud storage may be suitable for data that is accessed infrequently or retained for a relatively long time. The second type of cloud storage may be more cost-effective than the first type of cloud storage, which can be desirable for archiving historical data, backups, regulatory compliance data, etc.

At 715, the authorized user 410 of the DMS 110 may obtain an authentication token 415 from a vault 405 (such as an identity-based secrets and encryption management system) that is integrated with or otherwise accessible to the DMS 110. The authorized user 410 may obtain the authentication token 415 via a UI, CLI, or API provided by the vault 405. As described herein, the vault 405 may verify the identity of the authorized user 410 and return an authentication token 415, which enables the authorized user 410 to access one or more secrets (such as a set of cloud credentials 435) protected by the vault. In some implementations, a computing device 115 of the authorized user 410 may cache the authentication token 415 such that the computing device 115 can re-use the authentication token 415 without additional calls to the vault 405.

At 720, the authorized user 410 may transmit (via the computing device 115) an API call to an endpoint associated with the tracing support library 250. As described herein, an "endpoint" refers to an identifier of a network entity (such as a server, physical/virtual machine, data center, or the like), application, or service that provides access to a particular resource (such as the tracing support library 250). The API call may include the authentication token 415 and a request to fetch, download, extract, and/or restore two or more observability data sets 245 from the cloud storage environment 205. The API call may also indicate a selected time range that spans one or multiple time intervals. In some implementations, the selected time range may correspond to a detected failure or performance issue associated with the node 198-*a*.

At 725, the DMS 110 may use the tracing support library 250 to verify the identity of the authorized user 410 based on the authentication token 415 and other authentication details provided with the request. For example, the DMS 110 may use the tracing support library 250 to fetch authentication details for the authorized user 410, check the authorization status of the authorized user 410, and fetch a set of cloud credentials 435 from the vault 405 using the information provided by the authorized user 410. The tracing support library 250 of the DMS 110 may use the set of cloud credentials 435 to access the cloud storage environment 205 at 730. In some implementations, accessing the cloud storage environment 205 may include transmitting one or more commands 320 to fetch, download, or restore the two or more observability data sets 245 from the cloud storage environment 205.

At 735, the DMS 110 may use the tracing support library 250 to retrieve two or more observability data sets 245 from the cloud storage environment 205. In some implementations, to retrieve the two or more observability data sets 245, the tracing support library 250 may use one or more cloud APIs 315 exposed by the cloud storage environment 205 to asynchronously restore one or more of the observability data sets 245 from the second type of cloud storage to the first type of cloud storage. The two or more observability data sets 245 may be associated with respective time intervals within the selected time range. As described herein, the two or more observability data sets 245 may contain various time-partitioned data blocks that include tracing data 225 associated with operations performed by the node 198-*a* during the selected time range.

At 740, the DMS 110 may use the tracing support library 250 to process the two or more observability data sets 245 retrieved from the cloud storage environment 205. For example, the DMS 110 may use the tracing support library 250 to download the two or more observability data sets 245 from the cloud storage environment 205 and extract (e.g., write) the tracing data 225 from the two or more observability data sets 245 into extraction directories 255 that are accessible to the triage service 260. As described herein, each observability data set 245 may include a block storage component containing one or more compacted or non-compacted (e.g., uncompacted) time-partitioned data blocks, a WAL block storage component containing one or more partial or full WAL blocks, an append file containing trace data, or a combination thereof.

At 745, the triage service 260 of the DMS 110 may combine (e.g., merge) the tracing data 225 present in the two or more observability data sets 245 by selecting a first subset of overlapping time-partitioned data blocks that correspond to an overlapping time interval 605 between the set of time intervals, omitting a second subset of the overlapping time-partitioned data blocks that correspond to the overlapping time interval 605, and retaining one or more non-overlapping time-partitioned data blocks that correspond to an earlier time interval or a later time interval of the set of time intervals. In some implementations, the overlapping time-partitioned data blocks may result from a difference between a trace data retention period and an observability data set collection period of the DMS 110. The overlapping time-partitioned data blocks may include compacted data blocks, non-compacted data blocks, WAL blocks, an append file, or any combination thereof.

At 750, the triage service 260 may transmit data associated with a visualization 280 of the merged tracing data 265 for the selected time range, thereby enabling the authorized user 410 to visualize the operations performed by the node 198-a during the selected time range. For example, the triage service 260 may save the merged tracing data 265 to an extraction directory 270, and a visualization generator 275 (which, in some implementations, may be supported by the distributed tracing service 215) may use the merged tracing data 265 in the extraction directory 270 to generate a unified (e.g., non-time-partitioned) visualization 280 of the merged tracing data 265. Accordingly, the computing device 115 associated with the authorized user 410 may render the visualization 280 of the merged tracing data 265, for example, via a UI of the distributed tracing service 215 (such as Grafana Tempo).

Figure 8:
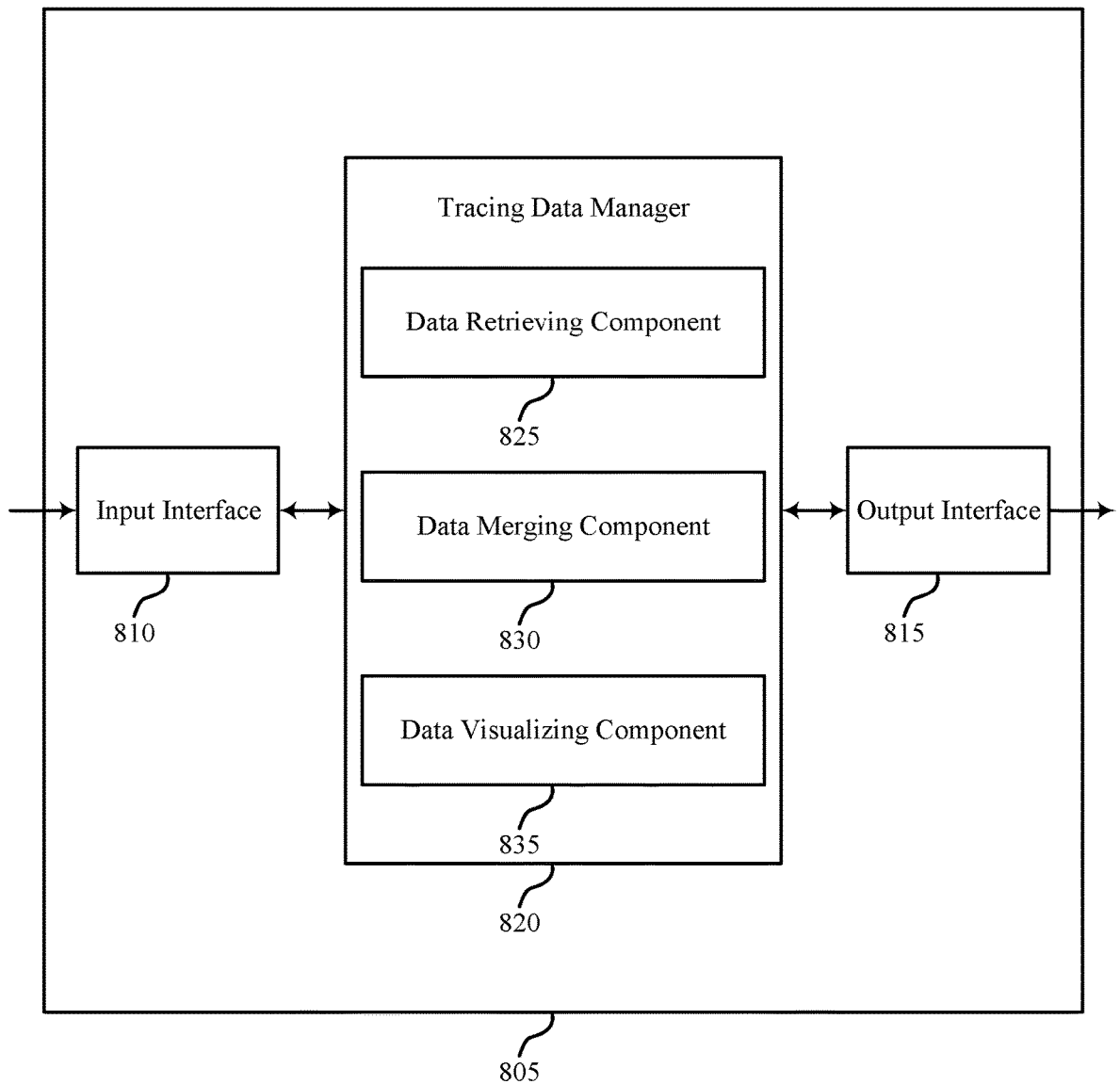
FIG. 8 shows a block diagram of an apparatus that supports merging and visualizing observability data sets in accordance with aspects of the present disclosure.

FIG. 8 shows a block diagram 800 of a system 805 that supports merging and visualizing observability data sets in accordance with aspects of the present disclosure. In some examples, the system 805 may be an example of aspects of one or more components described with reference to FIG. 1, such as a DMS 110. The system 805 may include an input interface 810, an output interface 815, and a tracing data manager 820. The system 805 may also include one or more processors. Each of these components may be in communication with one another (e.g., via one or more buses, communications links, communications interfaces, or any combination thereof).

The input interface 810 may manage input signaling for the system 805. For example, the input interface 810 may receive input signaling (e.g., messages, packets, data, instructions, commands, or any other form of encoded information) from other systems or devices. The input interface 810 may send signaling corresponding to (e.g., representative of or otherwise based on) such input signaling to other components of the system 805 for processing. For example, the input interface 810 may transmit such corresponding signaling to the tracing data manager 820 to support merging and visualizing observability data sets. In some cases, the input interface 810 may be a component of a network interface 1025 as described with reference to FIG. 10.

The output interface 815 may manage output signaling for the system 805. For example, the output interface 815 may receive signaling from other components of the system 805, such as the tracing data manager 820, and may transmit such output signaling corresponding to (e.g., representative of or otherwise based on) such signaling to other systems or devices. In some cases, the output interface 815 may be a component of a network interface 1025 as described with reference to FIG. 10.

For example, the tracing data manager 820 may include a data retrieving component 825, a data merging component 830, a data visualizing component 835, or any combination thereof. In some examples, the tracing data manager 820, or various components thereof, may be configured to perform various operations (e.g., receiving, monitoring, transmitting) using or otherwise in cooperation with the input interface 810, the output interface 815, or both. For example, the tracing data manager 820 may receive information from the input interface 810, send information to the output interface 815, or be integrated in combination with the input interface 810, the output interface 815, or both to receive information, transmit information, or perform various other operations as described herein.

The tracing data manager 820 may support techniques for merging/visualizing observability data in accordance with examples disclosed herein. The data retrieving component 825 may be configured to or otherwise capable of retrieving, from a cloud storage environment 205 accessible to a DMS 110, two or more observability data sets 245 associated with a set of time intervals within a selected time range, the two or more observability data sets 245 including a set of time-partitioned data blocks that include tracing data 225 associated with operations performed by one or more nodes 198 of a node cluster 196 of the DMS 110 during the selected time range. The data merging component 830 may be configured to or otherwise capable of merging, by a triage service 260 of the DMS 110, the tracing data 225 present in the two or more observability data sets 245 based on selecting a first subset of overlapping time-partitioned data blocks that correspond to an overlapping time interval 605 between the set of time intervals, omitting a second subset of the overlapping time-partitioned data blocks that correspond to the overlapping time interval 605, and retaining one or more non-overlapping time-partitioned data blocks that correspond to an earlier time interval or a later time interval of the set of time intervals. The data visualizing component 835 may be configured to or otherwise capable of transmitting, by the DMS 110, data corresponding to a visualization 280 of the merged tracing data 265 associated with the selected time range.

Figure 9:
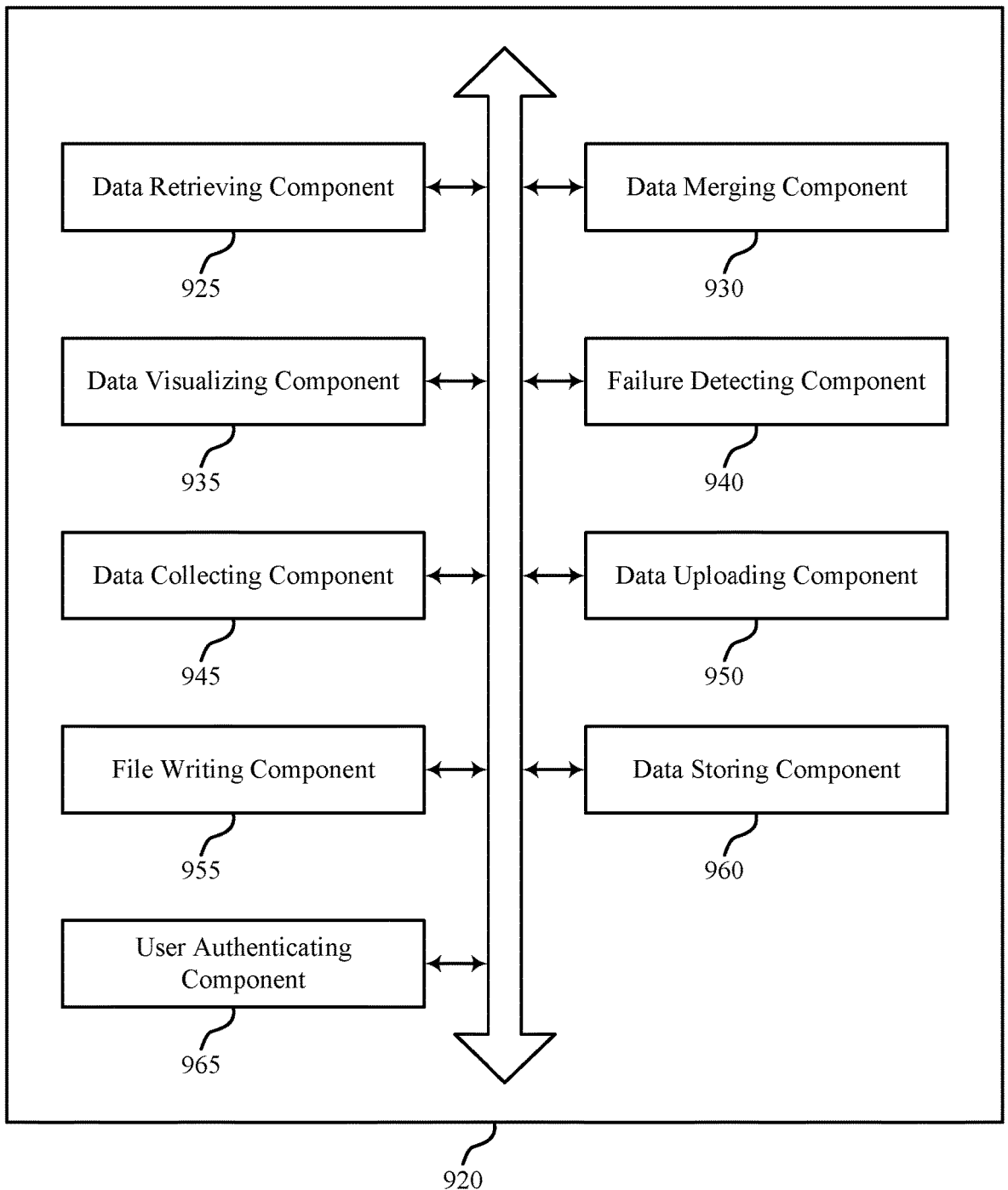
FIG. 9 shows a block diagram of a tracing data manager that supports merging and visualizing observability data sets in accordance with aspects of the present disclosure.

FIG. 9 shows a block diagram 900 of a tracing data manager 920 that supports merging and visualizing observability data sets 245 in accordance with aspects of the present disclosure. The tracing data manager 920 may be an example of aspects of the tracing data manager 820, as shown and described with reference to FIG. 8. The tracing data manager 920, or various components thereof, may be an example of means for performing various aspects of merging and visualizing observability data sets 245. For example, the tracing data manager 920 may include a data retrieving component 925, a data merging component 930, a data visualizing component 935, a failure detecting component 940, a data collecting component 945, a data uploading component 950, a file writing component 955, a data storing component 960, a user authenticating component 965, or any combination thereof. Each of these components, or components of subcomponents thereof (e.g., one or more processors, one or more memories), may communicate, directly or indirectly, with one another (e.g., via one or more buses, communications links, communications interfaces, or any combination thereof).

The tracing data manager 920 may support techniques for merging/visualizing observability data in accordance with examples disclosed herein. The data retrieving component 925 may be configured to or otherwise capable of retrieving, from a cloud storage environment 205 accessible to a DMS 110, two or more observability data sets 245 associated with a set of time intervals within a selected time range, the two or more observability data sets 245 including a set of time-partitioned data blocks that include tracing data 225 associated with operations performed by one or more nodes 198 of a node cluster 196 of the DMS 110 during the selected time range. The data merging component 930 may be configured to or otherwise capable of merging, by a triage service 260 of the DMS 110, the tracing data 225 present in the two or more observability data sets 245 based on selecting a first subset of overlapping time-partitioned data blocks that correspond to an overlapping time interval 605 between the set of time intervals, omitting a second subset of the overlapping time-partitioned data blocks that correspond to the overlapping time interval 605, and retaining one or more non-overlapping time-partitioned data blocks that correspond to an earlier time interval or a later time interval of the set of time intervals. The data visualizing component 935 may be configured to or otherwise capable of transmitting, by the DMS 110, data corresponding to a visualization 280 of the merged tracing data 265 associated with the selected time range.

In some examples, the failure detecting component 940 may be configured to or otherwise capable of detecting, by the DMS 110, a failure or performance issue associated with at least one operation performed by the one or more nodes 198 of the node cluster 196, where the selected time range corresponds to the detected failure or performance issue.

In some examples, the data visualizing component 935 may be configured to or otherwise capable of generating, by the DMS 110, the visualization 280 of the merged tracing data 265 as part of a performance investigation related to the detected failure or performance issue.

In some examples, the data collecting component 945 may be configured to or otherwise capable of acquiring, by a distributed tracing service 215 of the DMS 110, the tracing data 225 from one or more processing services 220 running on the one or more nodes 198 of the node cluster 196. In some examples, the data uploading component 950 may be configured to or otherwise capable of uploading, to the cloud storage environment 205, the two or more observability data sets 245 containing the tracing data 225.

In some examples, the data retrieving component 925 may be configured to or otherwise capable of downloading, by the DMS 110, the two or more observability data sets 245 from the cloud storage environment 205 using a tracing support library 250. In some examples, the file writing component 955 may be configured to or otherwise capable of writing, by the tracing support library 250, the tracing data 225 from the two or more observability data sets 245 to a data file in an extraction directory 270, where the triage service 260 uses the data file to merge the tracing data 225 associated with the selected time range.

In some examples, the data storing component 960 may be configured to or otherwise capable of storing, by the DMS 110, the two or more observability data sets 245 in a first type of cloud storage (such as hot storage 305) for a first duration of time. In some examples, the data storing component 960 may be configured to or otherwise capable of archiving, by the DMS 110, the two or more observability data sets 245 in a second type of cloud storage (such as cold storage 310) after the first duration of time.

In some examples, the two or more observability data sets 245 are retained in the second type of cloud storage for a second duration of time indicated by a cloud retention policy of the DMS 110.

In some examples, to support retrieving the two or more observability data sets 245, the data storing component 960 may be configured to or otherwise capable of asynchronously restoring, by the DMS 110, at least one observability data set from the second type of cloud storage to the first type of cloud storage using one or more APIs 315 provided by the cloud storage environment 205, where at least some of the merged tracing data 265 is from the at least one observability data set restored from the second type of cloud storage.

In some examples, to support merging the tracing data 225, the data merging component 930 may be configured to or otherwise capable of combining the set of time-partitioned data blocks of the two or more observability data sets 245 into a non-time-partitioned visualization 280 of the merged tracing data 265.

In some examples, the user authenticating component 965 may be configured to or otherwise capable of retrieving, by an authorized user 410 of the DMS 110, an authentication token 415 from an identity-based secrets and encryption management system (such as the vault 405) integrated with the DMS 110. In some examples, the user authenticating component 965 may be configured to or otherwise capable of transmitting, to an endpoint associated with the tracing support library 250, a request to fetch, download, extract, or restore the two or more observability data sets 245 from the cloud storage environment 205, where the request includes the authentication token 415 retrieved from the identity-based secrets and encryption management system.

In some examples, the user authenticating component 965 may be configured to or otherwise capable of verifying, by the endpoint associated with the tracing support library 250, an identity of the authorized user 410 based on the authentication token 415 provided with the request and a set of cloud credentials 435 obtained from the identity-based secrets and encryption management system. In some examples, the data retrieving component 925 may be configured to or otherwise capable of retrieving, by the endpoint associated with the tracing support library 250, the two or more observability data sets 245 from the cloud storage environment 205 using the set of cloud credentials 435 obtained from the identity-based secrets and encryption management system.

In some examples, at least one observability data set includes block storage containing one or more compacted or non-compacted time-partitioned data blocks, WAL block storage containing one or more partial or full WAL blocks, an append file containing trace data, or a combination thereof.

In some examples, a difference between a trace data retention period and an observability data set collection period corresponds to a duration of overlap between the two or more observability data sets 245.

In some examples, at least some of the set of time-partitioned data blocks are immutable. In some examples, the subset of overlapping time-partitioned data blocks correspond to the duration of overlap between the two or more observability data sets 245.

In some examples, the subset of overlapping time-partitioned data blocks include compacted data blocks, non-compacted data blocks, WAL blocks, an append file, or any combination thereof.

In some examples, overlapping time-partitioned data blocks corresponding to the later time interval are selected for inclusion within the merged tracing data 265 and overlapping time-partitioned data blocks corresponding to the earlier time interval are omitted from the merged tracing data 265.

In some examples, to support merging the tracing data, the data merging component 930 may be configured to or otherwise capable of retaining a first set of write ahead log blocks that correspond to the earlier time interval; and omitting a second set of write ahead log blocks that correspond to the later time interval.

Figure 10:
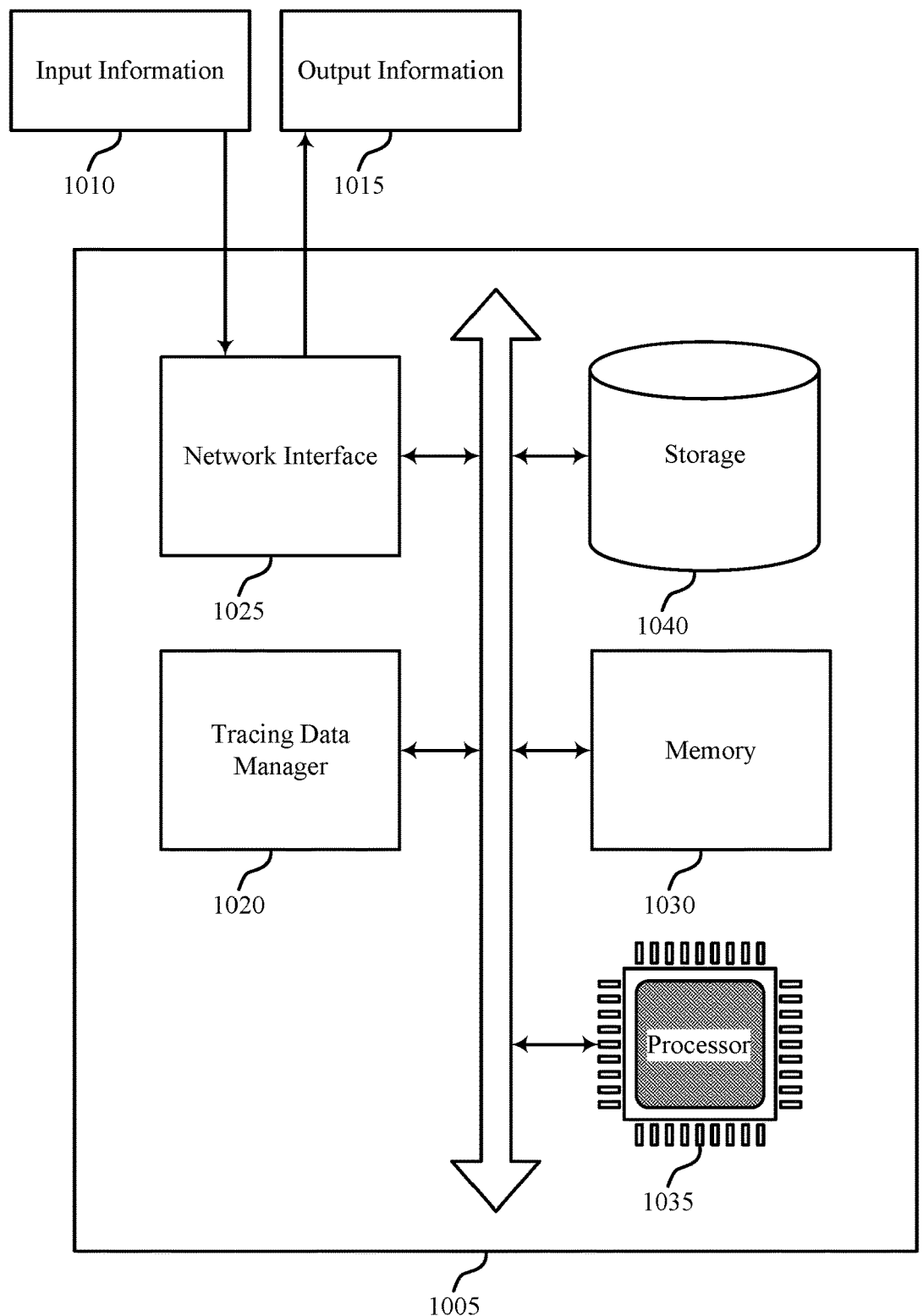
FIG. 10 shows a diagram of a system including a device that supports merging and visualizing observability data sets in accordance with aspects of the present disclosure.

FIG. 10 shows a block diagram 1000 of a system 1005 that supports merging and visualizing observability data sets 245 in accordance with aspects of the present disclosure. The system 1005 may be an example of (or include the components of) a system 805, as described herein. The system 1005 may include components for data management, including components such as a tracing data manager 1020, an input information 1010, an output information 1015, a network interface 1025, at least one memory 1030, at least one processor 1035, and a storage 1040. These components may be in electronic communication or otherwise coupled with each other (e.g., operatively, communicatively, functionally, electronically, electrically; via one or more buses, communications links, communications interfaces, or any combination thereof). Additionally, the components of the system 1005 may include corresponding physical components or may be implemented as corresponding virtual components (e.g., components of one or more virtual machines). In some examples, the system 1005 may be an example of aspects of one or more components described with reference to FIG. 1, such as a DMS 110.

The network interface 1025 may enable the system 1005 to exchange information (e.g., input information 1010, output information 1015, or both) with other systems or devices (not shown). For example, the network interface 1025 may enable the system 1005 to connect to a network (e.g., a network 120 as described herein). The network interface 1025 may include one or more wireless network interfaces, one or more wired network interfaces, or any combination thereof. In some examples, the network interface 1025 may be an example of may be an example of aspects of one or more components described with reference to FIG. 1, such as one or more network interfaces 165.

Memory 1030 may include RAM, ROM, or both. The memory 1030 may store computer-readable, computer-executable software including instructions that, when executed, cause the processor 1035 to perform various functions described herein. In some cases, the memory 1030 may contain, among other things, a basic input/output system (BIOS), which may control basic hardware or software operation such as the interaction with peripheral components or devices. In some cases, the memory 1030 may be an example of aspects of one or more components described with reference to FIG. 1, such as one or more memories 175.

The processor 1035 may include an intelligent hardware device, (e.g., a general-purpose processor, a digital signal processor (DSP), a central processing unit (CPU), a microcontroller, an application-specific integrated circuit (ASIC), a field programmable gate array (FPGA), a programmable logic device, a discrete gate or transistor logic component, a discrete hardware component, or any combination thereof). The processor 1035 may be configured to execute computer-readable instructions stored in a memory 1030 to perform various functions (e.g., functions or tasks supporting merging and visualizing observability data sets 245). Though a single processor 1035 is depicted in the example of FIG. 10, it is to be understood that the system 1005 may include any quantity of one or more of processors 1035 and that a group of processors 1035 may collectively perform one or more functions ascribed herein to a processor, such as the processor 1035. In some cases, the processor 1035 may be an example of aspects of one or more components described with reference to FIG. 1, such as one or more processors 170.

Storage 1040 may be configured to store data that is generated, processed, stored, or otherwise used by the system 1005. In some cases, the storage 1040 may include one or more HDDs, one or more SDDs, or both. In some examples, the storage 1040 may be an example of a single database, a distributed database, multiple distributed databases, a data store, a data lake, or an emergency backup database. In some examples, the storage 1040 may be an example of one or more components described with reference to FIG. 1, such as one or more network disks 180.

The tracing data manager 1020 may support techniques for merging/visualizing observability data in accordance with examples disclosed herein. For example, the tracing data manager 1020 may be configured to or otherwise capable of retrieving, from a cloud storage environment 205 accessible to a DMS 110, two or more observability data sets 245 associated with a set of time intervals within a selected time range, the two or more observability data sets 245 including a set of time-partitioned data blocks that include tracing data 225 associated with operations performed by one or more nodes 198 of a node cluster 196 of the DMS 110 during the selected time range. The tracing data manager 1020 may be configured to or otherwise capable of merging, by a triage service 260 of the DMS 110, the tracing data 225 present in the two or more observability data sets 245 based on selecting a first subset of overlapping time-partitioned data blocks that correspond to an overlapping time interval 605 between the set of time intervals, omitting a second subset of the overlapping time-partitioned data blocks that correspond to the overlapping time interval 605, and retaining one or more non-overlapping time-partitioned data blocks that correspond to an earlier time interval or a later time interval of the set of time intervals. The tracing data manager 1020 may be configured to or otherwise capable of transmitting, by the DMS 110, data corresponding to a visualization 280 of the merged tracing data 265 associated with the selected time range.

By including or configuring the tracing data manager 1020 in accordance with examples as described herein, the system 1005 may support techniques for merging and visualizing observability data sets 245, which may provide one or more benefits such as, for example, improved user experience, more efficient utilization of computing/storage resources, improved scalability, and improved performance diagnostics, among other possibilities.

Figure 11:
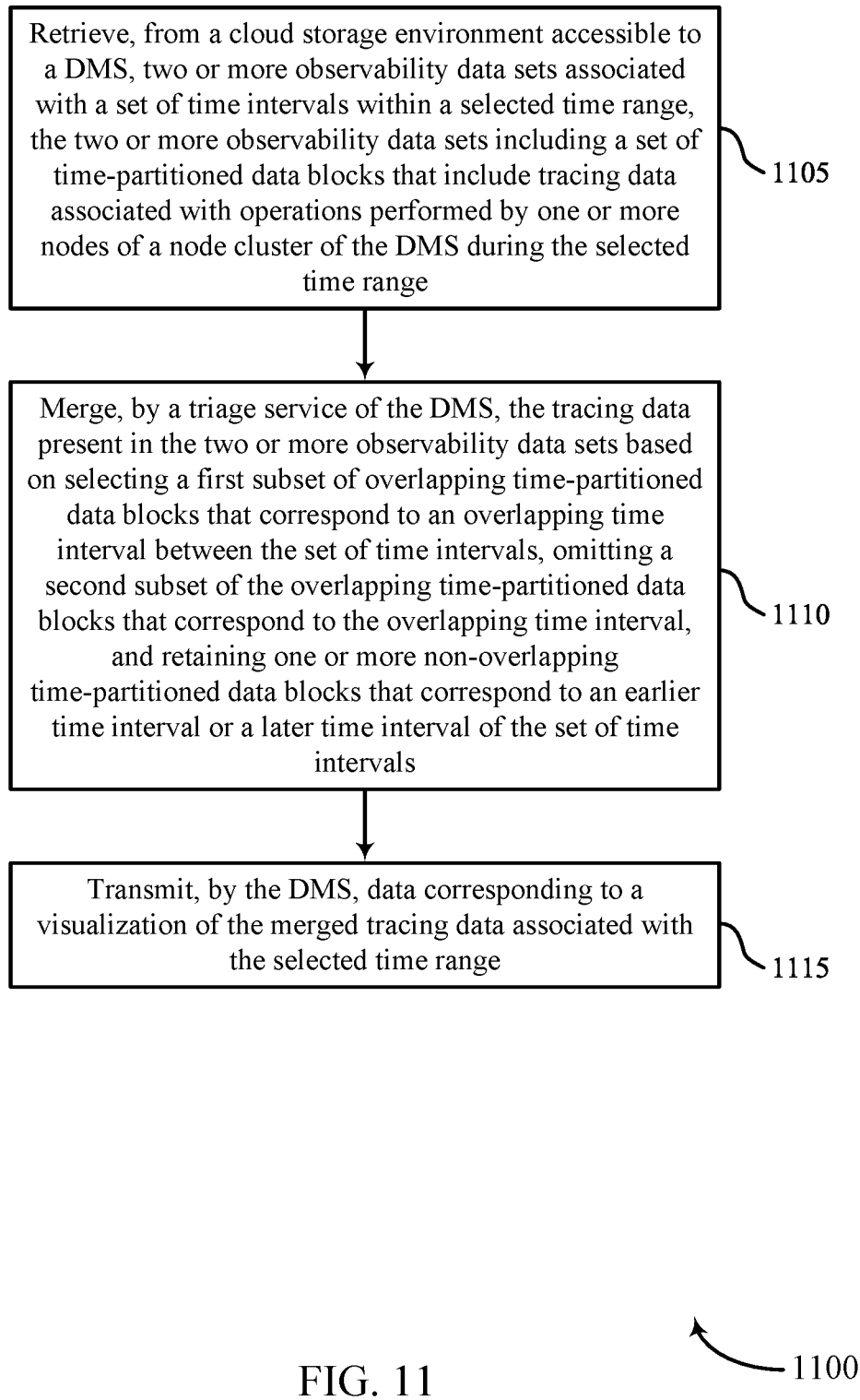
FIG. 11 shows a flowchart illustrating methods that support merging and visualizing observability data sets in accordance with aspects of the present disclosure.

FIG. 11 shows a flowchart illustrating a method 1100 that supports merging and visualizing observability data sets 245 in accordance with aspects of the present disclosure. The operations of the method 1100 may be implemented by the DMS 110 (or components thereof), as described with reference to FIGS. 1 through 10. In some examples, the DMS 110 may execute a set of instructions to control the functional elements of the DMS 110 to perform the described functions. Additionally, or alternatively, the DMS 110 may perform aspects of the described functions using special-purpose hardware.

At 1105, the method 1100 includes retrieving, from a cloud storage environment 205 accessible to a DMS 110, two or more observability data sets 245 associated with a set of time intervals within a selected time range, the two or more observability data sets 245 including a set of time-partitioned data blocks that include tracing data associated with operations performed by one or more nodes 198 of a node cluster 196 of the DMS 110 during the selected time range. In some examples, aspects of the operations of 1105 may be performed by a data retrieving component 925, as described with reference to FIG. 9.

At 1110, the method 1100 includes merging, by a triage service 260 of the DMS 110, the tracing data 225 present in the two or more observability data sets 245 based on selecting a first subset of overlapping time-partitioned data blocks that correspond to an overlapping time interval 605 between the set of time intervals, omitting a second subset of the overlapping time-partitioned data blocks that correspond to the overlapping time interval 605, and retaining one or more non-overlapping time-partitioned data blocks that correspond to an earlier time interval or a later time interval of the set of time intervals. In some examples, aspects of the operations of 1110 may be performed by a data merging component 930, as described with reference to FIG. 9.

At 1115, the method 1100 includes transmitting, by the DMS 110, data corresponding to a visualization 280 of the merged tracing data 265 associated with the selected time range. In some examples, aspects of the operations of 1115 may be performed by a data visualizing component 935, as described with reference to FIG. 9.

The following provides an overview of aspects of the present disclosure:

Aspect 1: A method for data processing, comprising: retrieving, from a cloud storage environment accessible to a DMS, two or more observability data sets associated with a plurality of time intervals within a selected time range, the two or more observability data sets comprising a plurality of time-partitioned data blocks that include tracing data associated with operations performed by one or more nodes of a node cluster of the DMS during the selected time range; merging, by a triage service of the DMS, the tracing data present in the two or more observability data sets based at least in part on selecting a first subset of overlapping time-partitioned data blocks that correspond to an overlapping time interval between the set of time intervals, omitting a second subset of the overlapping time-partitioned data blocks that correspond to the overlapping time interval, and retaining one or more non-overlapping time-partitioned data blocks that correspond to an earlier time interval or a later time interval of the set of time intervals; and transmitting, by the DMS, data corresponding to a visualization of the merged tracing data associated with the selected time range.

Aspect 2: The method of aspect 1, further comprising: detecting, by the DMS, a failure or performance issue associated with at least one operation performed by the one or more nodes of the node cluster, wherein the selected time range corresponds to the detected failure or performance issue.

Aspect 3: The method of aspect 2, further comprising: generating, by the DMS, the visualization of the merged tracing data as part of a performance investigation related to the detected failure or performance issue.

Aspect 4: The method of any of aspects 1 through 3, further comprising: acquiring, by a distributed tracing service of the DMS, the tracing data from one or more processing services provided by the one or more nodes of the node cluster; and uploading, to the cloud storage environment, the two or more observability data sets containing the tracing data.

Aspect 5: The method of any of aspects 1 through 4, further comprising: downloading, by the DMS, the two or more observability data sets from the cloud storage environment using a tracing support library; and writing, by the DMS, the tracing data from the two or more observability data sets to a data file using the tracing support library, wherein the triage service uses the data file to merge the tracing data associated with the selected time range.

Aspect 6: The method of any of aspects 1 through 5, further comprising: storing, by the DMS, the two or more observability data sets in a first type of cloud storage for a first duration of time; and archiving, by the DMS, the two or more observability data sets in a second type of cloud storage after the first duration of time.

Aspect 7: The method of aspect 6, wherein the two or more observability data sets are retained in the second type of cloud storage for a second duration of time indicated by a cloud retention policy of the DMS.

Aspect 8: The method of any of aspects 6 through 7, wherein retrieving the two or more observability data sets comprises: asynchronously restoring, by the DMS, at least one observability data set from the second type of cloud storage to the first type of cloud storage using one or more APIs provided by the cloud storage environment, wherein at least some of the merged tracing data is from the at least one observability data set restored from the second type of cloud storage.

Aspect 9: The method of any of aspects 1 through 8, wherein merging the tracing data comprises: combining the plurality of time-partitioned data blocks of the two or more observability data sets into a non-time-partitioned visualization of the merged tracing data.

Aspect 10: The method of any of aspects 1 through 9, further comprising: retrieving, by an authorized user of the DMS, an authentication token from an identity-based secrets and encryption management system integrated with the DMS; and transmitting, to an endpoint associated with a tracing support library provided by the DMS, a request to fetch, download, extract, or restore the two or more observability data sets from the cloud storage environment, wherein the request comprises the authentication token retrieved from the identity-based secrets and encryption management system.

Aspect 11: The method of aspect 10, further comprising: verifying, by the endpoint associated with the tracing support library, an identity of the authorized user based at least in part on the authentication token provided with the request and a set of cloud credentials obtained from the identity-based secrets and encryption management system; and retrieving, by the endpoint associated with the tracing support library, the two or more observability data sets from the cloud storage environment using the set of cloud credentials obtained from the identity-based secrets and encryption management system.

Aspect 12: The method of any of aspects 1 through 11, wherein at least some of the plurality of time-partitioned data blocks are immutable.

Aspect 13: The method of any of aspects 1 through 12, wherein at least one observability data set comprises block storage containing one or more compacted or non-compacted time-partitioned data blocks, WAL block storage containing one or more partial or full WAL blocks, an append file containing trace data, or a combination thereof.

Aspect 14: The method of any of aspects 1 through 13, wherein a difference between a trace data retention period and an observability data set collection period corresponds to a duration of overlap between the two or more observability data sets.

Aspect 15: The method of aspect 14, wherein the subset of overlapping time-partitioned data blocks correspond to the duration of overlap between the two or more observability data sets.

Aspect 16: The method of any of aspects 1 through 15, wherein the subset of overlapping time-partitioned data blocks comprise compacted data blocks, non-compacted data blocks, WAL blocks, an append file, or any combination thereof.

Aspect 17: The method of any of aspects 1 through 16, wherein overlapping time-partitioned data blocks corresponding to the later time interval are selected for inclusion within the merged tracing data and overlapping time-partitioned data blocks corresponding to the earlier time interval are omitted from the merged tracing data.

Aspect 18: A DMS, comprising: one or more memories storing processor-executable code; and one or more processors coupled with the one or more memories, wherein the one or more processors are individually or collectively operable to execute the processor-executable code to cause the DMS to perform a method of any of aspects 1 through 17.

Aspect 19: An apparatus for data processing, comprising: at least one means for performing a method of any of aspects 1 through 17.

Aspect 20: A non-transitory computer-readable medium storing code that comprises instructions executable by one or more processors to perform a method of any of aspects 1 through 17.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, "a component" having characteristics or performing functions may refer to "at least one of one or more components" having a particular characteristic or performing a particular function. Subsequent reference to a component introduced with the article "a" using the terms "the" or "said" refers to any or all of the one or more components. For example, a component introduced with the article "a" shall be understood to mean "one or more components," and referring to "the component" subsequently in the claims shall be understood to be equivalent to referring to "at least one of the one or more components."

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for data processing, comprising:
retrieving, from a cloud storage environment accessible to a data management system (DMS), two or more observability data sets associated with a plurality of time intervals within a selected time range, the two or more observability data sets comprising a plurality of time-partitioned data blocks that include tracing data associated with operations performed by one or more nodes of a node cluster of the DMS during the selected time range;
merging, by a triage service of the DMS, the tracing data present in the two or more observability data sets based at least in part on selecting a first subset of overlapping time-partitioned data blocks that correspond to an overlapping time interval between the plurality of time intervals, omitting a second subset of the overlapping time-partitioned data blocks that correspond to the overlapping time interval, and retaining one or more non-overlapping time-partitioned data blocks that correspond to an earlier time interval or a later time interval of the plurality of time intervals; and
transmitting, by the DMS, data corresponding to a visualization of the merged tracing data associated with the selected time range.

2. The method of claim 1, further comprising:
detecting, by the DMS, a failure or performance issue associated with at least one operation performed by the one or more nodes of the node cluster, wherein the selected time range corresponds to the detected failure or performance issue.

3. The method of claim 2, further comprising:
generating, by the DMS, the visualization of the merged tracing data as part of a performance investigation related to the detected failure or performance issue.

4. The method of claim 1, further comprising:
acquiring, by a distributed tracing service of the DMS, the tracing data from one or more processing services provided by the one or more nodes of the node cluster; and
uploading, to the cloud storage environment, the two or more observability data sets containing the tracing data.

5. The method of claim 1, further comprising:
downloading, by the DMS, the two or more observability data sets from the cloud storage environment using a tracing support library; and
writing, by the DMS, the tracing data from the two or more observability data sets to a data file using the tracing support library, wherein the triage service uses the data file to merge the tracing data associated with the selected time range.

6. The method of claim 1, further comprising:
storing, by the DMS, the two or more observability data sets in a first type of cloud storage for a first duration of time; and
archiving, by the DMS, the two or more observability data sets in a second type of cloud storage after the first duration of time.

7. The method of claim 6, wherein the two or more observability data sets are retained in the second type of cloud storage for a second duration of time indicated by a cloud retention policy of the DMS.

8. The method of claim 6, wherein retrieving the two or more observability data sets comprises:
asynchronously restoring, by the DMS, at least one observability data set from the second type of cloud storage to the first type of cloud storage using one or more application programming interfaces (APIs) provided by the cloud storage environment, wherein at least some of the merged tracing data is from the at least one observability data set restored from the second type of cloud storage.

9. The method of claim 1, wherein merging the tracing data comprises:
combining the plurality of time-partitioned data blocks of the two or more observability data sets into a non-time-partitioned visualization of the merged tracing data.

10. The method of claim 1, further comprising:
retrieving, by an authorized user of the DMS, an authentication token from an identity-based secrets and encryption management system integrated with the DMS; and
transmitting, to an endpoint associated with a tracing support library provided by the DMS, a request to fetch, download, extract, or restore the two or more observability data sets from the cloud storage environment, wherein the request comprises the authentication token retrieved from the identity-based secrets and encryption management system.

11. The method of claim 10, further comprising:
verifying, by the endpoint associated with the tracing support library, an identity of the authorized user based at least in part on the authentication token provided with the request and a set of cloud credentials obtained from the identity-based secrets and encryption management system; and retrieving, by the endpoint associated with the tracing support library, the two or more observability data sets from the cloud storage environment using the set of cloud credentials obtained from the identity-based secrets and encryption management system.

12. The method of claim 1, wherein at least some of the plurality of time-partitioned data blocks are immutable.

13. The method of claim 1, wherein at least one observability data set comprises block storage containing one or more compacted or non-compacted time-partitioned data blocks, write ahead log block storage containing one or more partial or full write ahead log blocks, an append file containing trace data, or a combination thereof.

14. The method of claim 1, wherein a difference between a trace data retention period and an observability data set collection period corresponds to a duration of overlap between the two or more observability data sets.

15. The method of claim 14, wherein the subset of overlapping time-partitioned data blocks correspond to the duration of overlap between the two or more observability data sets.

16. The method of claim 1, wherein the subset of overlapping time-partitioned data blocks comprise compacted data blocks, non-compacted data blocks, write ahead log blocks, an append file, or any combination thereof.

17. The method of claim 1, wherein overlapping time-partitioned data blocks corresponding to the later time interval are selected for inclusion within the merged tracing data and overlapping time-partitioned data blocks corresponding to the earlier time interval are omitted from the merged tracing data.

18. The method of claim 1, wherein merging the tracing data comprises:
retaining a first set of write ahead log blocks that correspond to the earlier time interval; and
omitting a second set of write ahead log blocks that correspond to the later time interval.

19. A data management system (DMS), comprising:
one or more memories storing processor-executable code; and
one or more processors coupled with the one or more memories and individually or collectively operable to execute the code to cause the DMS to:
retrieve, from a cloud storage environment accessible to the DMS, two or more observability data sets associated with a plurality of time intervals within a selected time range, the two or more observability data sets comprising a plurality of time-partitioned data blocks that include tracing data associated with operations performed by one or more nodes of a node cluster of the DMS during the selected time range;
merge, by a triage service of the DMS, the tracing data present in the two or more observability data sets based at least in part on selecting a first subset of overlapping time-partitioned data blocks that correspond to an overlapping time interval between the set of time intervals, omitting a second subset of the overlapping time-partitioned data blocks that correspond to the overlapping time interval, and retaining one or more non-overlapping time-partitioned data blocks that correspond to an earlier time interval or a later time interval of the set of time intervals; and
transmit, by the DMS, data corresponding to a visualization of the merged tracing data associated with the selected time range.

20. A non-transitory computer-readable medium storing code that comprises instructions executable by one or more processors to:
retrieve, from a cloud storage environment accessible to a data management system (DMS), two or more observability data sets associated with a plurality of time intervals within a selected time range, the two or more observability data sets comprising a plurality of time-partitioned data blocks that include tracing data associated with operations performed by one or more nodes of a node cluster of the DMS during the selected time range;
merge, by a triage service of the DMS, the tracing data present in the two or more observability data sets based at least in part on selecting a first subset of overlapping time-partitioned data blocks that correspond to an overlapping time interval between the plurality of time intervals, omitting a second subset of the overlapping time-partitioned data blocks that correspond to the overlapping time interval, and retaining one or more non-overlapping time-partitioned data blocks that correspond to an earlier time interval or a later time interval of the plurality of time intervals; and
transmit, by the DMS, data corresponding to a visualization of the merged tracing data associated with the selected time range.

* * * * *